(12) United States Patent
Omura et al.

(10) Patent No.: US 8,889,813 B2
(45) Date of Patent: *Nov. 18, 2014

(54) MIXTURE COMPRISING SULFONATE GROUP-CONTAINING COMPOUND AND METHOD OF MANUFACTURING THE SAME, SOLUTION COMPOSITION, POLYURETHANE RESIN AND METHOD OF MANUFACTURING THE SAME, AND MAGNETIC RECORDING MEDIUM

(71) Applicant: FUJIFILM Corporation, Tokyo (JP)

(72) Inventors: Kazufumi Omura, Kanagawa (JP); Katsumi Araki, Araki (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,356

(22) Filed: Mar. 5, 2013

(65) Prior Publication Data

US 2013/0184426 A1 Jul. 18, 2013

Related U.S. Application Data

(62) Division of application No. 12/768,437, filed on Apr. 27, 2010, now Pat. No. 8,415,036.

(30) Foreign Application Priority Data

Apr. 28, 2009 (JP) ................. 2009-109683

(51) Int. Cl.
| | | |
|---|---|---|
| C08G 18/08 | (2006.01) | |
| C08G 18/38 | (2006.01) | |
| G11B 5/702 | (2006.01) | |
| C08G 18/32 | (2006.01) | |
| C08G 18/66 | (2006.01) | |

(52) U.S. Cl.
CPC ........ C08G 18/3857 (2013.01); C08G 18/0828 (2013.01); G11B 5/7021 (2013.01); C08G 18/3212 (2013.01); C08G 18/6685 (2013.01); C08G 18/3855 (2013.01)
USPC ................ 528/53; 528/52; 528/65; 528/85

(58) Field of Classification Search
USPC .................... 528/52, 53, 65, 75, 85
See application file for complete search history.

(56) References Cited

U.S. PATENT DOCUMENTS

| | | | |
|---|---|---|---|
| 3,084,187 A | 4/1963 | Gaertner | |
| 6,677,036 B2 | 1/2004 | Noguchi et al. | |
| 7,438,983 B2 * | 10/2008 | Takahashi et al. | ......... 428/845.1 |
| 7,737,304 B2 | 6/2010 | Omura et al. | |
| 7,737,305 B2 | 6/2010 | Omura et al. | |
| 2005/0170217 A1 | 8/2005 | Takahashi et al. | |
| 2009/0087687 A1 | 4/2009 | Omura et al. | |
| 2009/0258254 A1 | 10/2009 | Omura et al. | |

FOREIGN PATENT DOCUMENTS

| | | |
|---|---|---|
| JM | 49-053182 | 5/1974 |
| JP | 02-053219 A | 2/1990 |
| JP | 03-66660 A | 3/1991 |
| JP | 10-218854 A | 8/1998 |
| JP | 2003-132531 A | 5/2003 |
| JP | 2008-233271 A | 10/2008 |
| JP | 2009-096798 A | 5/2009 |
| JP | 5199899 B2 | 1/2013 |

* cited by examiner

Primary Examiner — Michael L Leonard
(74) Attorney, Agent, or Firm — Sughrue Mion, PLLC

(57) ABSTRACT

An aspect of the present invention relates to a mixture of a sulfonate group-containing compound denoted by general formula (1) with a protonic acid:

General formula (1)

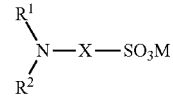

wherein, in general formula (1), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a cation.

6 Claims, No Drawings

MIXTURE COMPRISING SULFONATE GROUP-CONTAINING COMPOUND AND METHOD OF MANUFACTURING THE SAME, SOLUTION COMPOSITION, POLYURETHANE RESIN AND METHOD OF MANUFACTURING THE SAME, AND MAGNETIC RECORDING MEDIUM

CROSS-REFERENCE TO RELATED APPLICATIONS

This is a Divisional Application of U.S. Ser. No. 12/768,437 filed Apr. 27, 2010 which claims the benefit of priority under 35 USC 119 to Japanese Patent Application No. 2009-109683, filed on Apr. 28, 2009, the disclosures of which are expressly incorporated herein by reference in their entirety.

BACKGROUND OF THE INVENTION

1. Field of the Invention

The present invention relates to a mixture comprising a sulfonate group-containing compound and to a solution composition prepared from the mixture, and more particularly, to a mixture comprising a sulfonate group-containing compound with good storage stability in organic solvents and to a solution composition prepared from the mixture.

The present invention further relates to polyurethane resin obtained using the above mixture or solution composition as a starting material, to a method of manufacturing the polyurethane resin, and to a magnetic recording medium comprising the above polyurethane resin as binder.

2. Discussion of the Background

In recent years, methods of transmitting information at high speed have developed markedly, making it possible to transmit images and data comprised of immense amounts of information. As data transmission technology has improved, there has been a demand to further increase the recording density of recording and reproduction devices and recording media for recording, reproducing, and storing information.

The use of microparticulate magnetic powder, the high-degree dispersion of microparticulate magnetic powder, and increasing the smoothness of the surface of the magnetic layer are known to be effective ways of achieving good electromagnetic characteristics in the field of high-density recording. The method of incorporating a sulfonic acid (salt) group, such as $SO_3Na$ group, into the binder is known to enhance the dispersibility of microparticulate magnetic powder. In this connection, reference can be made to Japanese Unexamined Patent Publication (KOKAI) No. 2003-132531 or English language family member U.S. Pat. No. 6,677,036, which are expressly incorporated herein by reference in their entirety.

The method of employing a sulfonic acid polyol into which a sulfonic acid (salt) group has been incorporated as a starting material diol is an example of a method of incorporating a sulfonic acid (salt) group into the polyurethane resins that are widely employed as binders in magnetic recording media. Polyester sulfonic acid polyols are among known sulfonic acid polyols. However, in polyester sulfonic acid polyols, sulfonic acid (salt) groups become localized in some of the oligomer components, and are present in a nonuniform state. Accordingly, in the polyurethanes obtained using these polyester sulfonic acid polyols as starting material polyols, the sulfonic acid (salt) groups are also present in a nonuniform state, in some cases resulting in polyurethanes containing almost no sulfonic acid (salt) groups. Such polyurethanes adsorb poorly to magnetic powder and do not afford good dispersion-enhancing effects. The polyurethane that does not adsorb may migrate to the surface of the medium, potentially generating head grime and compromising running durability.

Accordingly, it is also conceivable to employ a sulfonic acid diol monomer to obtain a polyurethane resin in which sulfonic acid (salt) groups are uniformly present. An example of such a sulfonic acid diol is N,N-bis(hydroxyalkyl)aminoethyl sulfonate described in Japanese Unexamined Patent Publication (KOKAI) Heisei No. 3-66660, However, conventional sulfonic acid diols, including the sulfonic acid diol described in Japanese Unexamined Patent Publication (KOKAI) Heisei No. 3-66660, are highly soluble in water and poorly soluble in organic solvents. Since polyurethane resins are generally synthesized in organic solvents, it is difficult to achieve a reaction that proceeds smoothly with sulfonic acid diols that are poorly soluble in organic solvents. Good solubility in organic solvents is also desirable from the perspective of utility as a starting material in organic synthesis.

In contrast, the present inventors previously discovered a sulfonic acid (salt) group-containing polyol compound with good solubility in organic solvents, that is described in Japanese Unexamined Patent Publication (KOKAI) No. 2009-96798, published on May 7, 2009, which is expressly incorporated herein by reference in its entirety. In the present specification, the term "sulfonic acid (salt) group" includes the sulfonic acid group ($-SO_3H$) and sulfonate groups such as $-SO_3Na$, $-SO_3Li$, and $-SO_3K$. The sulfonic acid (salt) group-containing polyol described in Japanese Unexamined Patent Publication (KOKAI) No. 2009-96798 is highly soluble in organic solvents, and can thus be employed in uniform system reactions in organic solvents. Accordingly, the above sulfonic acid (salt) group-containing polyol is suitable as an organic synthesis starting material, including as a starting material of polyurethane. However, research conducted by the present inventors has revealed that when stored in an organic solvent, the above sulfonic acid (salt) group-containing polyol undergoes a substantial change in pH over time. It is required to improve the storage stability in organic solvent to increase the overall utility as an organic synthesis starting material of the above sulfonic acid (salt) group-containing polyol compound.

SUMMARY OF THE INVENTION

An aspect of the present invention provides for a sulfonic acid (salt) group-containing polyol compound with good solubility and storage stability in organic solvents.

The present inventors conducted extensive research, resulting in the discovery that the storage stability in organic solvent of the above sulfonic acid (salt) group-containing polyol compound could be improved by placing the base form in the presence of a protonic acid. The present invention was devised on that basis.

An aspect of the present invention relates to a mixture of a sulfonate group-containing compound denoted by general formula (1) with a protonic acid:

General formula (1)

wherein, in general formula (1), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a cation.

In general formula (1), each of $R^1$ and $R^2$ may independently denote a group denoted by general formula (A):

General formula (A)

wherein, in general formula (A), * denotes a position of a bond with a nitrogen atom, and $R^a$ denotes an alkyl group with 2 to 20 carbon atoms, an aryl group with 6 to 20 carbon atoms, an aralkyl group with 7 to 20 carbon atoms, an alkoxyalkyl group with 2 to 20 carbon atoms, or an aryloxyalkyl groups with 7 to 20 carbon atoms.

In general formula (1), each of $R^1$ and $R^2$ may independently denote a group denoted by general formula (B):

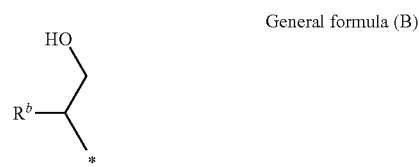

General formula (B)

wherein, in general formula (B), * denotes a position of a bond with a nitrogen atom, $R^b$ denotes an alkyl group with 2 to 20 carbon atoms, an aryl group with 6 to 20 carbon atoms, an aralkyl group with 7 to 20 carbon atoms, an alkoxyalkyl group with 2 to 20 carbon atoms, or an aryloxyalkyl group with 7 to 20 carbon atoms.

The protonic acid may comprise at least one selected from the group consisting of a carboxylic acid, sulfonic acid, phosphoric acid, phosphonic acid, and phenol.

The protonic acid may comprise a sulfonic acid group-containing compound in which M in general formula (1) denotes a hydrogen atom.

The above mixture may comprise 0.05 to 0.50 mole of the protonic acid per 1 mole of the sulfonate group-containing compound.

A further aspect of the present invention relates to a method of manufacturing the above mixture by adding a protonic acid to the sulfonate group-containing compound denoted by general formula (1).

The protonic acid may comprise at least one selected from the group consisting of a carboxylic acid, sulfonic acid, phosphoric acid, phosphonic acid, and phenol.

The protonic acid may be added in a quantity of 0.05 to 0.50 mole per 1 mole of the sulfonate group-containing compound.

A still further aspect of the present invention relates to a method of manufacturing the above mixture by, in a step of reacting a sulfonic acid (salt) group-containing amine with an oxilane, conducting the reaction in the presence of 0.50 to 0.95 mole percent of a base relative to the sulfonic acid (salt) groups contained in the amine.

The sulfonic acid (salt) group-containing amine may be selected from the group consisting of an amino benzene sulfonic acid and a salt thereof, and 2-aminoethanesulfonic acid and a salt thereof.

A still further aspect of the present invention relates to a solution composition comprised of an organic solvent in which the above mixture is dissolved.

The organic solvent may be an aprotic organic solvent.

The aprotic organic solvent may be a solvent selected from the group consisting of toluene, 2-butanone, cyclohexanone, and a mixed solvent comprising two or more thereof.

A still further aspect of the present invention relates to a polyurethane resin obtained from starting materials in the form of an isocyanate compound and the above mixture or a solution composition comprised of an organic solvent in which the mixture is dissolved.

The polyurethane resin may comprise a sulfonic acid (salt) group in a quantity of $1 \times 10^{-5}$ eq/g to $2 \times 10^{-3}$ eq/g.

The starting materials may further comprise a diol comprising a (meth)acryloyloxy group.

A still further aspect of the present invention relates to a method of manufacturing a polyurethane resin, comprising subjecting the above mixture or a solution composition comprised of an organic solvent in which the mixture is dissolved to an urethane-forming reaction with an isocyanate compound.

The urethane-forming reaction may be conducted in the presence of a catalyst.

The mixture or the solution composition may be subjected to the urethane-forming reaction after adding the catalyst thereto.

A still further aspect of the present invention relates to a magnetic recording medium comprising a magnetic layer comprising a ferromagnetic powder and a binder on a nonmagnetic support, wherein the binder comprises a polyurethane resin obtained from starting materials in the form of an isocyanate compound and the above mixture or a solution composition comprised of an organic solvent in which the mixture is dissolved.

A still further aspect of the present invention relates to a magnetic recording medium comprising a nonmagnetic layer comprising a nonmagnetic powder and a binder and a magnetic layer comprising a ferromagnetic powder and a binder in this order on a nonmagnetic support, wherein one or both of the magnetic layer and the nonmagnetic layer comprise the binder in the form of a polyurethane resin, the polyurethane resin being obtained from starting materials in the form of an isocyanate compound and the above mixture or a solution composition comprised of an organic solvent in which the mixture is dissolved.

The present invention permits the long-term storage of a sulfonate group-containing compound with good solubility in organic solvents in a stable state in organic solvents. This can enhance the utility of the sulfonate group-containing compound as a starting material in organic synthesis.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Mixture

The present invention relates to a mixture of a sulfonate group-containing compound denoted by general formula (1) with a protonic acid.

General formula (1)

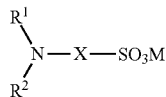

In general formula (1), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a cation.

In contrast to the poor solubility in organic solvents of conventionally known sulfonic acid diols, the sulfonate group-containing compound denoted by general formula (1) can exhibit good solubility in organic solvents. Since organic synthesis reactions are generally conducted in organic solvents, compounds that dissolve readily in organic solvents are suitable as organic synthesis starting materials. In the mixture of the present invention, by placing such a sulfonate group-containing compound in the presence of a protonic acid, the change over time in the pH of the sulfonate group-containing compound in organic solvent can be suppressed and thus good storage stability can be achieved. This good storage stability in organic solvents is extremely advantageous for storing and handling the compound in the form of a solution composition.

Details of the mixture of the present invention will be described below.

Sulfonate Group-Containing Compound Denoted by General Formula (1)

In general formula (1), X denotes a divalent linking group, desirably having 2 to 20 carbon atoms from the perspective of solubility in organic solvents. A divalent hydrocarbon group is desirable; an alkylene group, arylene group, or a combination of two or more of these groups is preferred; an alkylene group or an arylene group is of greater preference; an ethylene group or a phenylene group is of still greater preference; and an ethylene group is optimal.

Examples of the phenylene group are o-phenylene, m-phenylene, and p-phenylene groups. An o-phenylene or m-phenylene group is desirable, and an m-phenylene group is preferred.

The above alkylene group desirably comprises equal to or more than 2 but equal to or less than 20, preferably equal to or more than 2 but equal to or less than 4, and more preferably 2, carbon atoms. The alkylene group may be a linear alkylene group or branched alkylene group; a linear alkylene group is desirable.

The above arylene group desirably comprises equal to or more than 6 but equal to or less than 20, preferably equal to or more than 6 but equal to or less than 10, and more preferably 6, carbon atoms.

The above alkylene and arylene groups may be substituted or unsubstituted. Examples of substituents are given below. The alkylene group or arylene group is desirable comprised of just carbon atoms and hydrogen atoms. In the present invention, when a substituent is present on a given group, the term "number of carbon atoms" of that group refers to the number of carbon atoms excluding the substituent.

Examples of substituents that are optionally present on the alkylene group are: aryl groups, halogen atoms (fluorine, chlorine, bromine, and iodine atoms), alkoxy groups, aryloxy groups, and alkyl groups.

Examples of substituents that are optionally present on the arylene group are: alkyl groups, halogen atoms (fluorine, chlorine, bromine, and iodine atoms), alkoxy groups, aryloxy groups, and aryl groups.

In general formula (1), each of $R^1$ and $R^2$ independently denotes an alkyl group comprising at least one hydroxyl group and equal to or more than three carbon atoms or an aralkyl group comprising at least one hydroxyl group and equal to or more than eight carbon atoms. The alkyl group and aralkyl group may have substituents other than hydroxyl groups.

In addition to hydroxyl groups, the above alkyl group and aralkyl group may comprise substituents in the form of alkoxy groups, aryloxy groups, halogen atoms (fluorine, chlorine, bromine, and iodine atoms), sulfonyl groups, and silyl groups, for example. Of these, alkoxy groups and aryloxy groups are desirable; alkoxy groups having 1 to 20 carbon atoms and aryloxy groups having 6 to 20 carbon atoms are preferred; and phenoxy groups and alkoxy groups having 1 to 4 carbon atoms are of greater preference.

These alkyl groups and aralkyl groups may be linear or branched.

One or more hydroxyl groups are contained, 1 or 2 are desirable, and 1 is preferred, in each of $R^1$ and $R^2$. From the perspective of utility as a polyurethane starting material, the sulfonate group-containing compound denoted by general formula (1) is preferably a sulfonate group-containing diol compound.

From the perspective of solubility in organic solvents, the alkyl group in $R^1$ and $R^2$ comprises equal to or more than 3, desirably 3 to 22, preferably 4 to 22, and more preferably, 4 to 8 carbon atoms.

From the perspective of solubility in organic solvents, the aralkyl group in $R^1$ and $R^2$ comprises equal to or more than 8, desirably 8 to 22, preferably 8 to 12, and more preferably, 8 carbon atoms. In the aralkyl group contained in $R^1$ and $R^2$, saturated hydrocarbon chains are desirably present at the α-position and β-position of the nitrogen atom. In that case, a hydroxyl group may be present at the β-position of a nitrogen atom.

In $R^1$ and $R^2$, a hydroxyl group is desirably not present at the α-position of a nitrogen atom, one hydroxyl group is desirably present at the least the β-position of a nitrogen atom, and a single hydroxyl group is preferably present at the β-position of a nitrogen atom. The presence of a hydroxyl group at the β-position of a nitrogen atom can facilitate synthesis and enhance solubility in organic solvents.

Each of $R^1$ and $R^2$ independently preferably denotes an alkyl group comprising at least one hydroxyl group and 3 to 22 carbon atoms, an aralkyl group comprising at least one hydroxyl group and 8 to 22 carbon atoms, an alkoxyalkyl group comprising at least one hydroxyl group and 4 to 22 carbon atoms, or an aryloxyalkyl group comprising at least one hydroxyl group and 9 to 22 carbon atoms. An alkyl group comprising at least one hydroxyl group and 4 to 22 carbon atoms, an aralkyl group comprising at least one hydroxyl group and 8 to 22 carbon atoms, an alkoxyalkyl group comprising at least one hydroxyl group and 4 to 22 carbon atoms, or an aryloxyalkyl group comprising at least one hydroxyl group and 9 to 22 carbon atoms is preferred.

Specific examples of alkyl groups comprising at least one hydroxyl group and equal to or more than 3 carbon atoms are: 2-hydroxypropyl groups, 2-hydroxybutyl groups, 2-hydroxypentyl groups, 2-hydroxyhexyl groups, 2-hydroxyoctyl groups, 2-hydroxy-3-methoxypropyl groups, 2-hydroxy-3-ethoxypropyl groups, 2-hydroxy-3-butoxypropyl groups, 2-hydroxy-3-phenoxypropyl groups, 2-hydroxy-3-methoxybutyl groups, 2-hydroxy-3-methoxy-3-methylbutyl groups, 2,3-dihydroxypropyl groups, 3-hydroxypropyl groups, 3-hydroxybutyl groups, 4-hydroxybutyl groups, 1-methyl-2-hydroxyethyl groups, 1-ethyl-2-hydroxyethyl groups, 1-propyl-2-hydroxyethyl groups, 1-butyl-2-hydroxyethyl groups, 1-hexyl-2-hydroxyethyl groups, 1-methoxymethyl-2-hydroxyethyl groups, 1-ethoxymethyl-2-hydroxyethyl groups, 1-butoxymethyl-2-hydroxyethyl groups, 1-phenoxymethyl-2-hydroxyethyl groups, 1-(1-methoxyethyl)-2-hydroxyethyl groups, 1-(1-methoxy-1-methylethyl)-2-hydroxyethyl groups, and 1,3-dihydroxy-2-propyl groups. Of these, 2-hydroxybutyl groups, 2-hydroxy-3-methoxypropyl groups, 2-hydroxy-3-butoxypropyl groups, 2-hydroxy-3-phenoxypropyl groups, 1-methyl-2-hydroxyethyl groups, 1-methoxymethyl-2-hydroxyethyl groups, 1-butoxymethyl-2-hydroxyethyl groups, and 1-phenoxyethyl-2-hydroxyethyl groups are desirable examples.

Specific examples of aralkyl groups comprising at least one hydroxyl group and equal to or more than 8 carbon atoms are: 2-hydroxy-2-phenylethyl groups, 2-hydroxy-2-phenylpropyl groups, 2-hydroxy-3-phenylpropyl groups, 2-hydroxy-2-phenylbutyl groups, 2-hydroxy-4-phenylbutyl groups, 2-hydroxy-5-phenylpentyl groups, 2-hydroxy-2-(4-methoxyphenyl)ethyl groups, 2-hydroxy-2-(4-phenoxyphenyl)ethyl groups, 2-hydroxy-2-(3-methoxyphenyl)ethyl groups, 2-hydroxy-2-(4-chlorophenyl)ethyl groups, 2-hydroxy-2-(4-hydroxyphenyl)ethyl groups, 2-hydroxy-3-(4-methoxyphenyl)propyl groups, 2-hydroxy-3-(4-chlorophenyl)propyl groups, 1-phenyl-2-hydroxyethyl groups, 1-methyl-1-phenyl-2-hydroxyethyl groups, 1-benzyl-2-hydroxyethyl groups, 1-ethyl-1-phenyl-2-hydroxyethyl groups, 1-phenethyl-2-hydroxyethyl groups, 1-phenylpropyl-2-hydroxyethyl groups, 1-(4-methoxyphenyl)-2-hydroxyethyl groups, 1-(4-phenoxyphenyl)-2-hydroxyethyl groups, 1-(3-methoxyphenyl)-2-hydroxyethyl groups, 1-(4-chlorophenyl)-2-hydroxyethyl groups, 1-(4-hydroxyphenyl)-2-hydroxyethyl groups, and 1-(4-methoxyphenyl)-3-hydroxy-2-propyl groups. Of these, 2-hydroxy-2-phenylethyl groups and 1-phenyl-2-hydroxyphenyl groups are desirable examples.

The compound denoted by general formula (1) desirably comprises one or more aromatic ring within the molecule to enhance solubility in organic solvents.

In general formula (1), $R^1$ and $R^2$ may be identical or different, but are desirably identical to facilitate synthesis.

In formula (1), each of $R^1$ and $R^2$ desirably denotes a group with equal to or more than five carbon atoms. In general formula (1), each of $R^1$ and $R^2$ is desirably a group comprising an aromatic ring and/or an ether bond.

An example of a desirable embodiment of the compound denoted by general formula (1) is a compound in which each of $R^1$ and $R^2$ independently denotes the group denoted by general formula (A) below or the group denoted by general formula (B) below.

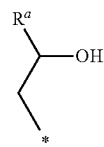

General formula (A)

In general formula (A), * denotes a position of a bond with a nitrogen atom, and $R^a$ denotes an alkyl group with 2 to 20 carbon atoms, an aryl group with 6 to 20 carbon atoms, an aralkyl group with 7 to 20 carbon atoms, an alkoxyalkyl group with 2 to 20 carbon atoms, or an aryloxyalkyl groups with 7 to 20 carbon atoms.

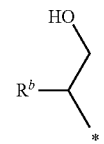

General formula (B)

In general formula (B), * denotes a position of a bond with a nitrogen atom, $R^b$ denotes an alkyl group with 2 to 20 carbon atoms, an aryl group with 6 to 20 carbon atoms, an aralkyl group with 7 to 20 carbon atoms, an alkoxyalkyl group with 2 to 20 carbon atoms, or an aryloxyalkyl group with 7 to 20 carbon atoms.

That is, general formula (2) denotes a compound having the group denoted by general formula (A) above and general formula (3) denotes a compound having the group denoted by general formula (B) above.

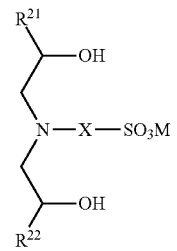

General formula (2)

In general formula (2), each of $R^{21}$ and $R^{22}$ is independently defined as being identical to $R^a$ in general formula (A), and X and M are identically defined with X and M, respectively, in general formula (1).

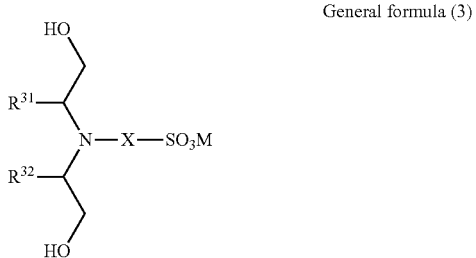

General formula (3)

In general formula (3), each of $R^{31}$ and $R^{32}$ is independently defined as being identical to $R^b$ in general formula (B), and X and M are identically defined with X and M, respectively, in general formula (1).

Each of $R^a$ and $R^b$ above ($R^a$ and $R^b$ will be collectively referred to as "R" hereinafter) independently denotes an alkyl group with 2 to 20 carbon atoms, an aryl group with 6 to 20 carbon atoms, an aralkyl group with 7 to 20 carbon atoms, an alkoxyalkyl group with 2 to 20 carbon atoms, or an aryloxyalkyl group with 7 to 20 carbon atoms.

The alkyl group denoted by R has 2 to 20, desirably 2 to 8, and preferably, 2 to 4 carbon atoms.

The aryl group denoted by R has 6 to 20, desirably 6 to 10, and preferably, 6 carbon atoms.

The aralkyl group denoted by R has 7 to 20, desirably 7 to 11 carbon atoms.

The alkoxyalkyl group denoted by R has 2 to 20, desirably 2 to 12, and preferably, 2 to 5 carbon atoms.

The aryloxyalkyl group denoted by R has 7 to 20, desirably 7 to 12, and preferably, 7 carbon atoms.

Each of the alkyl groups, aryl groups, aralkyl groups, alkoxyalkyl groups, and aryloxyalkyl groups denoted by R may be substituted or unsubstituted. Examples of substituents that may be present on the group denoted by R are halogen atoms (fluorine, chlorine, bromine, and iodine atoms), hydroxy groups, sulfonyl groups, and silyl groups.

The above alkyl group and aralkyl group may be linear or branched.

Each of the groups denoted by R desirably has two or more carbon atoms. Each of the groups denoted by R desirably comprises an aromatic ring and/or an ether bond.

The groups denoted by R are desirably ethyl groups, methoxymethyl groups, butoxymethyl groups, phenoxymethyl groups, or phenyl groups, and preferably methoxymethyl groups, butoxymethyl groups, phenoxymethyl groups, or phenyl groups.

In general formula (2), $R^{21}$ and $R^{22}$ may be identical or different, but are desirably identical to facilitate synthesis. The same applies to $R^{31}$ and $R^{32}$ in general formula (3).

In general formula (1), M denotes a cation. This cation may be an inorganic cation or an organic cation. The cation electrically neutralizes the —$SO_3^-$ in general formula (1). It is not limited to a monovalent cation, and can be a divalent or greater cation. A monovalent cation is desirable. When the valence of the cation denoted by M is given by n, M denotes (1/n) moles of the cation relative to the compound denoted by general formula (1).

The inorganic cation is not specifically limited; desirable examples are alkali metal ions and alkaline earth metal ions. Alkali metal ions are preferred examples, and $Li^+$, $Na^+$, and $K^+$ are examples of greater preference.

Examples of organic cations are ammonium ions, quaternary ammonium ions, and pyridinium ions.

Example compounds (S-1) to (S-51) below are desirable specific examples of the compound denoted by general formula (1). However, the present invention is not limited to these compounds. In the specific examples below, "Ph" denotes a phenyl group.

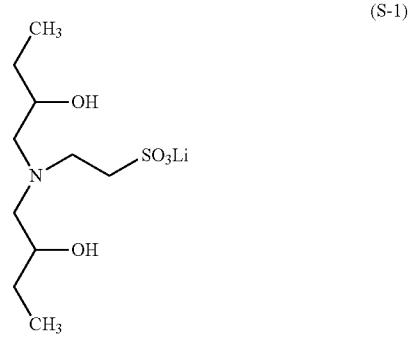

(S-1)

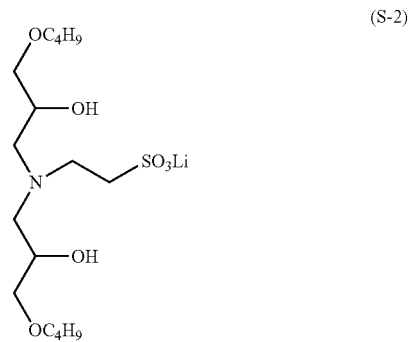

(S-2)

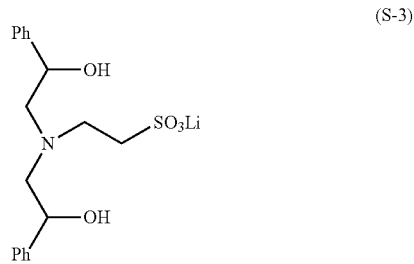

(S-3)

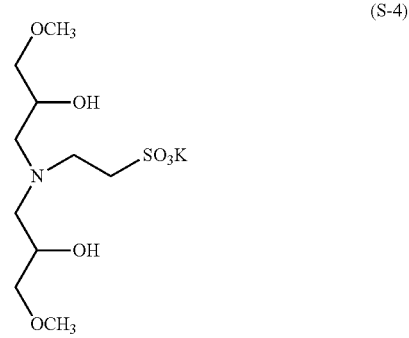

(S-4)

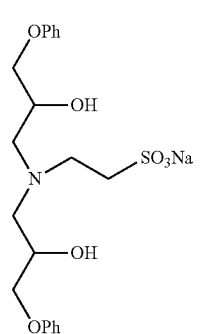
(S-5)
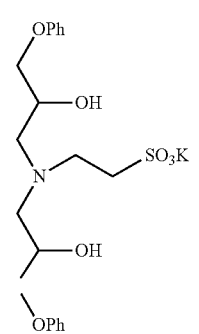
(S-6)
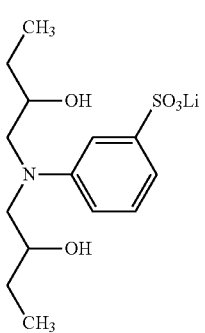
(S-7)
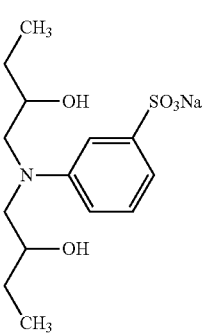
(S-8)
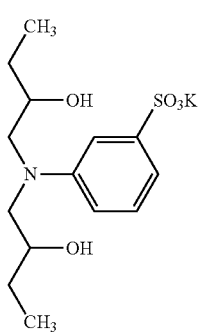
(S-9)
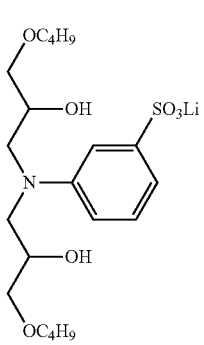
(S-10)
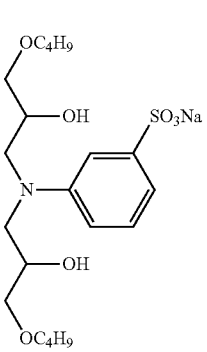
(S-11)
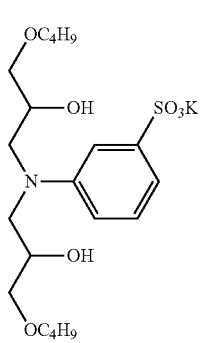
(S-12)
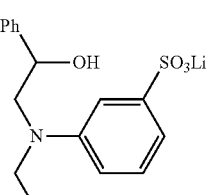
(S-13)
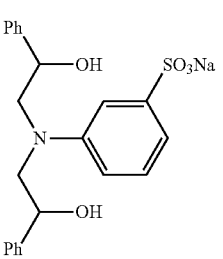
(S-14)

(S-15)
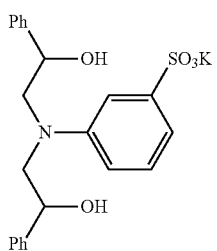
(S-16)
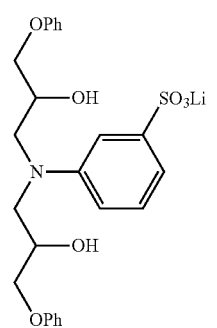
(S-17)
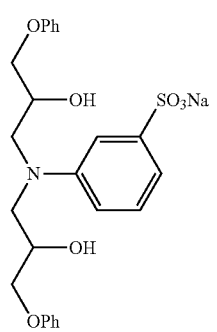
(S-18)
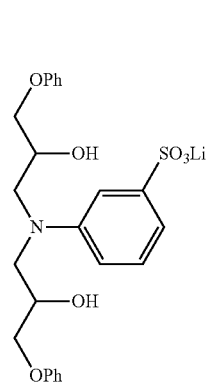
(S-19)
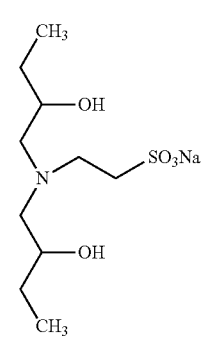
(S-20)
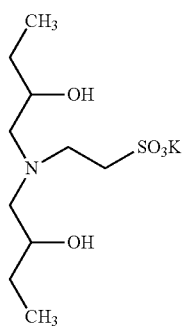
(S-21)
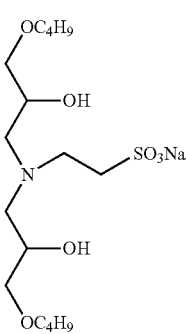
(S-22)
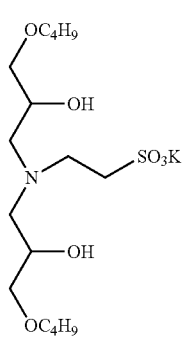
(S-23)
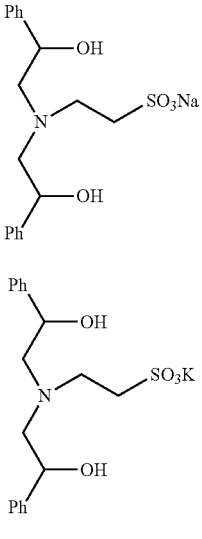
(S-24)
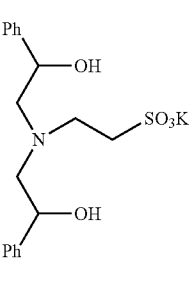

Chemical Structures (S-25) through (S-42)

Compounds S-25 through S-42 are amine-based structures with hydroxyl and sulfonate substituents.

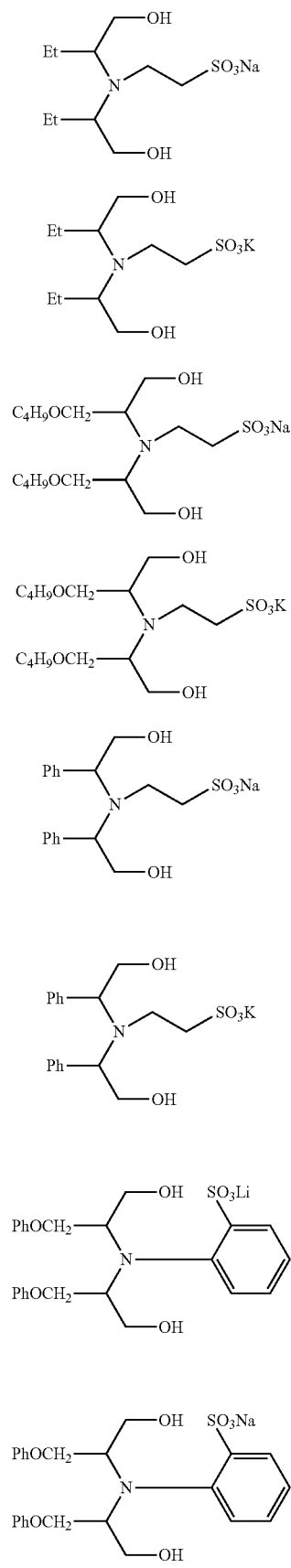
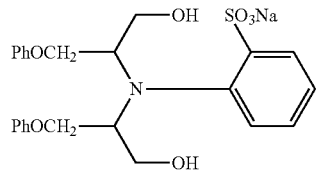

In the mixture of the present invention, the protonic acid that is incorporated along with the sulfonate group-containing compound can be any acid capable of releasing a proton, whether organic or inorganic. Specific examples are: carboxylic acids, sulfonic acids, phosphoric acids, phosphonic acids, and phenols. Examples of organic carboxylic acids are acetic acid, propionic acid, and octanoic acid. Acetic acid and octanoic acid are desirable. Examples of organic sulfonic acids are benzenesulfonic acid and p-toluenesulfonic acid.

The mixture of the present invention can contain, as a protonic acid, a sulfonic acid group-containing compound in which M in general formula (1) denotes a hydrogen atom. For example, a mixture comprising a sulfonate group-containing compound in which M denotes a cation in general formula (1) and a sulfonic acid group-containing compound differing from this compound only in that M denotes a hydrogen atom in general formula (1) can be obtained by Manufacturing Method 2, described further below. Further, a protonic acid in the form of a sulfonic acid group-containing compound in which M denotes a hydrogen atom in general formula (1) can be added to the sulfonate group-containing compound denoted by general formula (1) by Manufacturing Method 1, described further below. The sulfonic acid group-containing compound that is added can be obtained, for example, by subjecting the sulfonate group-containing compound denoted by general formula (1) to an ion exchange.

From the perspective of effectively suppressing the change in pH over time of the compound denoted by general formula (1) in organic solvents, the mixture of the present invention desirably contains 0.05 to 0.50 mole of protonic acid, preferably 0.05 to 0.30 mole of protonic acid, per 1 mole of the compound denoted by general formula (1).

The mixture of the present invention may be a solid or a liquid substance. It desirably contains an organic solvent in addition to the compound denoted by general formula (1) and a protonic acid. The mixture of the present invention may be contained in a dissolved state or in a suspended state in the organic solvent. For use in an organic synthesis reaction in a uniform system, it is desirably contained in a dissolved state in the organic solvent. That is, the compound of the present invention is desirably contained in a solution composition comprised of an organic solvent in which the mixture of the present invention is dissolved.

The solution composition will be described in greater detail below.

Solution Composition

The present invention relates to a solution composition comprised of an organic solvent in which the mixture of the present invention is dissolved. The solution composition of the present invention is useful as an organic synthesis starting material because it has good storage stability and does not undergo a major change in pH over time. The mixture of the present invention need only be dissolved in the solution composition of the present invention to a degree of visible transparency.

Examples of the organic solvent are: alcohol solvents such as methanol, ethanol, propanol, isopropanol, and butanol;

nitrile-based solvents such as acetonitrile; ketone-based solvents such as acetone, methyl ethyl ketone, methyl isobutyl ketone, diisobutyl ketone, cyclohexanone, and isophorone; ester-based solvents such as methyl acetate, ethyl acetate, and ethyl lactate; ether-based solvents such as dioxane and tetrahydrofuran; aromatic solvents such as toluene and xylene; sulfoxide solvents such as dimethyl sulfoxide; methylene chloride; chloroform; and cyclohexane.

Of these, from the perspective of utility in organic synthesis reactions such as polyurethane synthesis, aprotic solvents are desirable; ketone and aromatic solvents are preferred; toluene, 2-butanone, cyclohexanone, and mixed solvents comprising two or more thereof are of greater preference; and cyclohexanone is of even greater preference.

The solution composition of the present invention can be prepared by adding the mixture of the present invention to an organic solvent and stirring and the like as needed. The content of the mixture of the present invention in the solution composition of the present invention is desirably set to yield a content of equal to or greater than 10 weight parts, preferably equal to or greater than 20 weight parts, more preferably equal to or greater than 40 weight parts, and still more preferably, 40 to 90 weight parts of the compound denoted by general formula (1) per 100 weight parts of organic solvent.

Method of Manufacturing Mixture

The present invention further relates to a method of manufacturing the mixture of the present invention (referred to as "Manufacturing Method 1" hereinafter) by adding a protonic acid to the sulfonate group-containing compound denoted by general formula (1), and a method of manufacturing the mixture of the present invention (referred to as "Manufacturing Method 2" hereinafter) in a step of reacting a sulfonic acid (salt) group-containing amine with an oxilane in which the reaction is conducted in the presence of 0.50 to 0.95 mole percent of a base relative to the sulfonic acid (salt) groups contained in the amine. Manufacturing Methods 1 and 2 will be sequentially described below.

Manufacturing Method 1

In Manufacturing method 1, the mixture of the present invention is manufactured by adding a protonic acid to the sulfonate group-containing compound denoted by general formula (1). The details of the sulfonate group-containing compound denoted by general formula (1) are as set forth above.

The sulfonate group-containing compound denoted by general formula (1) can be synthesized by reacting a sulfonic acid (salt) group-containing amine with an oxilane in the presence of a base. The reaction is desirably conducted in a solvent that contains water and preferably conducted in water. The reaction conditions, the types of starting materials, the solvent employed, and the like can be suitably set.

Examples of the sulfonic acid (salt) group-containing amine are aminoalkane sulfonates and salts thereof and aminoarene sulfonates and salts thereof. Amino benzene sulfonic acid and salts thereof and 2-aminoethanesulfonic acid and salts thereof are desirable.

Examples of the oxilane are alkylene oxide and glycidyl ether. It can be selected based on the structure of the sulfonate group-containing compound being targeted. Specific examples of alkylene oxides are: ethylene oxide, propylene oxide, 1,2-butylene oxide, 2,3-butylene oxide, styrene oxide, and cyclohexanone oxide. Specific examples of glycidyl ethers are: methyl glycidyl ether, ethyl glycidyl ether, butyl glycidyl ether, phenyl glycidyl ether, and 2-ethylhexyl glycidyl ether.

A single base may be independently employed, or two or more bases may be employed in combination as the above base. The base that is employed is not specifically limited other than that it be able to provide a cation capable of becoming M in general formula (1). An alkali metal hydroxide is desirable. Specific examples are potassium hydroxide, sodium hydroxide, and lithium hydroxide.

The method used to isolate the compound denoted by general formula (1) may depend on the above-described base that are employed and the like. However, by way of example, a high purity sulfonate group-containing compound can be obtained by adding toluene dropwise to the reaction solution, precipitating the sulfonate group-containing compound, fractionating the mixture by filtration, decantation, or the like, and drying the product. The sulfonate group-containing compound obtained can be converted to other sulfonate group-containing compounds through salt exchange by known methods.

The type and quantity of protonic acid that is added to the compound denoted by general formula (1) (the blending ratio relative to the compound denoted by general formula (1)) are as set forth above. The compound denoted by general formula (1) and the protonic acid are desirably mixed in an organic solvent. The details of the organic solvent employed here are as set forth for the solution composition of the present invention above.

Manufacturing Method 2

Manufacturing method 2 is a method of manufacturing the mixture of the present invention in a step of reacting a sulfonic acid (salt) group-containing amine with an oxilane in which the reaction is conducted in the presence of 0.50 to 0.95 mole percent of a base relative to the sulfonic acid (salt) groups contained in the amine. The details of the sulfonic acid (salt) group-containing amine, oxilane, and base in Manufacturing method 2 are as set forth above for Manufacturing method 1. When the quantity of base employed is equal to or more than 1.0 equivalent of the sulfonic acid (salt) group-containing amine, it is possible to obtain a product in the form of a sulfonate group-containing compound in which M in general formula (1) is a cation (also referred to as the "base form" hereinafter). At from greater than 0 equivalent but less than 1.0 equivalent, a compound in which M in general formula (1) is a hydrogen atom (protonic acid; also referred to as the "acid form" hereinafter) is obtained in addition to the base form, yielding a mixture of the acid form and the base form. The mixture of the present invention can be obtained. However, when the quantity of base relative to the sulfonic acid (salt) groups contained in the sulfonic acid (salt) group-containing amine is less than 0.50 mole percent, the reaction does not proceed smoothly. When this quantity exceeds 0.95 mole percent, the solvent stability of the mixture obtained decreases. Accordingly, in Manufacturing method 2, a sulfonic acid (salt) group-containing amine and oxilane are reacted in the presence of 0.50 to 0.95 mole percent of a base relative to the sulfonic acid (salt) groups contained in the sulfonic acid (salt) group-containing amine. Thus, the mixture of the present invention can be obtained as a mixture of the acid form and base form with good solution stability. The quantity of base relative to the sulfonic acid (salt) groups contained in the sulfonic acid (salt) group-containing amine is desirably 0.70 to 0.95 mole percent. As set forth above, the reaction is desirably conducted in a solvent that contains water, preferably in water.

Polyurethane Resin

The polyurethane resin of the present invention is a polyurethane resin that is obtained from starting materials in the form of an isocyanate compound and the mixture of the present invention or the solution composition of the present invention.

The method of employing a sulfonic acid polyol into which has been incorporated a sulfonic acid (salt) group as a starting material diol is an example of a method of incorporating a sulfonic acid (salt) group into the polyurethane resins that are widely employed as binder in magnetic recording media. Polyester sulfonic acid polyols are among known sulfonic acid polyols. However, the sulfonic acid (salt) groups in polyester sulfonic acid polyols become localized on certain oligomer components, and are present in a nonuniform state. Accordingly, in polyurethanes obtained using such polyester sulfonic acid polyols as starting material diols, the sulfonic acid (salt) groups are also present in a nonuniform state. In some cases, this results in the production of a polyurethane that contains almost no sulfonic acid (salt) groups. Such polyurethanes adsorb poorly to magnetic powder and cannot produce a good dispersion-enhancing effect. The polyurethane that is unable to adsorb may migrate to the medium surface, potentially generating head grime and compromising running durability. By contrast, the polyurethane resin of the present invention comprises the sulfonate group-containing compound denoted by general formula (1) as a starting material. The sulfonate group-containing compound denoted by general formula (1) is highly soluble in the organic solvents employed in polyurethane polymerization. Further, since it is a monomer sulfonate group-containing polyol, the sulfonate groups (sulfonate groups and sulfonic acid groups when employing a mixture of the base form and the acid form) can be uniformly incorporated into the polyurethane. A polyurethane resin in which adsorptive functional groups in the form of sulfonic acid (salt) groups have been uniformly incorporated in this fashion permits a high degree of dispersion of powders such as magnetic powder and nonmagnetic powder in coating materials. Coatings formed by coating such coating materials are highly smooth. As a result, it becomes possible to obtain a magnetic recording medium with good electromagnetic characteristics.

The details of the mixture and solution composition of the present invention are as set forth above.

A bifunctional or greater multifunctional isocyanate compound (also referred to hereinafter as a "polyisocyanate") can be employed as the isocyanate compound. Examples of polyisocyanates that can be employed as starting materials are: diphenylmethane diisocyanate (MDI), 2,4-trilene diisocyanate (TDI), 2,6-TDI, 1,5-napththalene diisocyanate (NDI), tolidine diisocyanate (TODI), p-phenylene diisocyanate, xylylene diisocyanate (XDI), and other aromatic diisocyanates; transcyclohexane-1,4-diisocyanate, hexamethylene diisocyanate (HDI), isophorone diisocyanate (IPDI), hydrogenated xylylene diisocyanate ($H_6XDI$), hydrogenated diphenylmethane diisocyanate ($H_{12}MDI$), and other aliphatic and alicyclic diisocyanates.

In addition to the mixture or solution composition of the present invention and the isocyanate compound, a polyol can be included among the above starting materials. Polyols that can be employed are the various polyols that are generally employed as starting materials of polyurethane. For example, known polyester polyols, polyether polyols, polyether-ester polyols, polycarbonate polyols, polyolefin polyols, and dimer diols may be employed as necessary. Of these, the polyester polyols and polyether polyols are desirable.

The polyester polyol is obtained by polycondensing a polycarboxylic acid (polybasic acid) with a polyol, and desirably obtained by reacting a dibasic acid (dicarboxylic acid) with a diol. Dibasic acid components that can be employed in the polyester polyol are not specifically limited. Adipic acid, azelaic acid, phthalic acid, sodium sulfoisophthalic acid, and the like are desirable. Desirable diols include those having branched side chains, such as 2,2-dimethyl-1,3-propanediol, 2-ethyl-2-butyl-1,3-propanediol, and 3-methyl-1,5-pentanediol.

Polyether polyols with cyclic structures, such as polypropylene oxide adducts of bisphenol A and polyethylene oxide adducts of bisphenol A, are desirable.

In addition to the above polyol, as needed, a known short-chain diol with a molecular weight of about 200 to 500 can be employed as a chain-extending agent. Of these, aliphatic diols having a branched side chain with two or more carbon atoms, ether compounds having cyclic structures, short-chain diols having bridged hydrocarbon structures, and short-chain diols having spiro structures are desirable.

Further, a diol comprising at least one acrylic double bond within the molecule can be employed to impart a radiation curing property. The term "acrylic double bond" referred to in this context means a residue (acryloyl group or methacryloyl group) of acrylic acid, acrylic acid ester, acrylamide, methacrylic acid, methacrylic acid ester, or amide methacrylate. Of these, a diol having at least one (meth)acryloyloxy group is desirable, and a diol having at least one acryloyloxy group is preferred.

The following are examples of aliphatic diols having a branched side chain with two or more carbons: 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Of these, 2-ethyl-2-butyl-1,3-propanediol and 2,2-diethyl-1,3-propanediol are desirable.

Examples of ether compounds having cyclic structures are ethylene oxide adducts of bisphenol A, propylene oxide adducts of bisphenol A, ethylene oxide adducts of hydrogenated bisphenol A, and propylene oxide adducts of hydrogenated bisphenol A.

At least one structure selected from the group consisting of formulas (1) to (3) below is desirable as a bridged hydrocarbon structure or spiro structure.

(1)

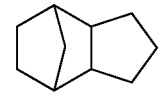
(2)

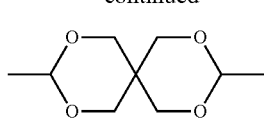

(3)

Specific examples of short-chain diols having a bridged hydrocarbon structure are: bicyclo[1.1.0]butanediol, bicyclo[1.1.1]pentanediol, bicyclo[2.1.0]pentanediol, bicyclo[2.1.1]hexanediol, bicyclo[3.1.0]hexanediol, bicyclo[2.2.1]heptanediol, bicyclo[3.2.0]heptanediol, bicyclo[3.1.1]heptanediol, bicyclo[2.2.2]octanediol, bicyclo[3.2.1]octanediol, bicyclo[4.2.0]octanediol, bicyclo[5.2.0]nonanediol, bicyclo[3.3.1]nonanediol, bicyclo[3.3.2]decanediol, bicyclo[4.2.2]decanediol, bicyclo[4.3.3]dodecanediol, bicyclo[3.3.3]undecanediol, bicyclo[1.1.0]butanedimethanol, bicyclo[1.1.1]pentanedimethanol, bicyclo[2.1.0]pentanedimethanol, bicyclo[2.1.1]hexanedimethanol, bicyclo[3.1.0]hexanedimethanol, bicyclo[2.2.1]heptanedimethanol, bicyclo[3.2.0]heptanedimethanol, bicyclo[3.1.1]heptanedimethanol, bicyclo[2.2.2]octanedimethanol, bicyclo[3.2.1]octanedimethanol, bicyclo[4.2.0]octanedimethanol, bicyclo[5.2.0]nonanedimethanol, bicyclo[3.3.1]nonanedimethanol, bicyclo[3.3.2]decanedimethanol, bicyclo[4.2.2]decanedimethanol, bicyclo[4.3.3]dodecanedimethanol, bicyclo[3.3.3]undecanedimethanol, tricyclo[2.2.1.0]heptanediol, tricyclo[5.2.1.0$^{2,6}$]decanediol, tricyclo[4.2.1.2$^{7,9}$]undecanediol, tricyclo[5.4.0.0$^{2,9}$]undecanediol, tricyclo[5.3.1.1]dodecanediol, tricyclo[4.4.1.1]dodecanediol, tricyclo[7.3.2.0$^{5,13}$]tetradecanediol, tricyclo[5.5.1.0$^{3,11}$]tridecanediol, tricyclo[2.2.1.0]heptanedimethanol, tricyclo[5.2.1.0$^{2,6}$]decanedimethanol, tricyclo[4.2.1.2$^{7,9}$]undecanedimethanol, tricyclo[5.4.0.0$^{2,9}$]undecanedimethanol, tricyclo[5.3.1.1]dodecanedimethanol, tricyclo[4.4.1.1]dodecanedimethanol, tricyclo[7.3.2.0$^{5,13}$]tetradecanedimethanol, and tricyclo[5.5.1.0$^{3,11}$]-tridecanedimethanol.

Of these, tricyclo[5.2.1.0$^{2,6}$]decanedimethanol is a desirable example.

Specific examples of short-chain diols having spiro structures are: spiro[3.4]octanedimethanol, Spiro[3.4]heptanedimethanol, Spiro[3.4]decanedimethanol, dispiro[5.1.7.2]heptadecanedimethanol, cyclopentanespirocyclobutanedimethanol, cyclohexanespirocyclopentanedimethanol, spirobicyclohexanedimethanol, and bis(1,1-dimethyl-2-hydroxyethyl)-2,4,8,10-hetraoxaspiro[5.5]undecane.

Bis(1,1-dimethyl-2-hydroxyethyl)-2,4,8,10-tetraoxaspiro[5.5]undecane is desirable.

Specific examples of diols comprising at least one acrylic double bond within the molecule are glycerol monoacrylate and glycerol monomethacrylate (Blemmer GLM, made by NOF Corporation) and bisphenol A type epoxy acrylate (Epoxyester 3000A, made by Kyoeisha Chemical Co., Ltd.).

The above polyurethane resin can be manufactured by polymerizing (polyadding) the mixture or solution composition of the present invention, an additional polyol, an isocyanate, and a chain-extending agent, as needed, in the presence of a catalyst. The compound denoted by general formula (1) is desirably added in a quantity yielding a sulfonate group content of equal to or greater than $1 \times 10^{-5}$ eq/g but equal to or less than $2 \times 10^{-3}$ eq/g in the polyurethane resin. The additional polyol is desirably added within a range of 20 to 45 weight percent. The isocyanate is desirably added in a quantity yielding a urethane group concentration falling within a range of 2.5 to 4.5 mmol/g in the polyurethane resin.

Known urethane resin polymerization catalysts may be employed as catalysts. Examples are tertiary amine catalysts and organic tin catalysts. Examples of tertiary amine catalysts are diethylene triamine, N-methylmorpholine, and tetramethyl hexamethylene diamine. Examples of organic tin catalysts are dibutyltin dilaurate and tin octoate. An organic tin catalyst is desirably employed as the catalyst.

The quantity of catalyst added is desirably 0.01 to 5 weight parts, preferably 0.01 to 1 weight part, and more preferably, 0.01 to 0.1 weight part, per the combined weight of the compound denoted by general formula (1), the other polyol, and the isocyanate employed in polymerization, and, as needed, other polymerization components, including chain-extending agents. From the perspective of controlling the reaction rate, the mixture or solution composition of the present invention is desirably subjected to the urethane-forming reaction with the isocyanate compound after the addition of the catalyst thereto.

The mixture or solution composition of the present invention, polyol, and polyisocyanate are desirably dissolved in solvent (polymerization solvent) and polymerized while conducting heating, pressurization, nitrogen substitution, and the like as needed. The solvent employed can be selected from among known solvents employed in the synthesis of polyurethane resin. Examples are: ketone-based solvents such as acetone, methyl ethyl ketone, and cyclohexanone; ester-based solvents such as methyl acetate, ethyl acetate, and ethyl lactate; ether-based solvents such as dioxane and tetrahydrofuran; aromatic solvents such as toluene and xylene; amide-based solvents such as N,N-dimethyl formamide, N,N-dimethyl acetamide, and N-methyl pyrrolidone; sulfoxide solvents such as dimethyl sulfoxide; methylene chloride; chloroform; and cyclohexanone. Of these, methyl ethyl ketone and cyclohexanone are suitably employed.

The weight average molecular weight of the polyurethane resin of the present invention is desirably equal to or greater than 10,000 but equal to or lower than 200,000 (in the present invention, the phrase "equal to or greater than 10,000 but equal to or lower than 200,000" may also be stated as "10,000 to 200,000"; identical below), preferably 40,000 to 100,000, and more preferably, 50,000 to 90,000. A weight average molecular weight of the polyurethane resin of equal to or greater than 10,000 is desirable in that good storage properties can be achieved, and desirably equal to or lower than 200,000 because powders can disperse well.

Examples of methods that can be used to keep the weight average molecular weight within the above-stated range are given below.

By way of example, the weight average molecular weight can be adjusted by slightly adjusting the mole ratio of glycol-derived OH groups to diisocyanate-derived NCO groups, and by employing a reaction catalyst.

Examples of reaction catalysts are: organic metal oxides such as dibutyltin dilaurate; tertiary amines such as triethylamine and triethylene diamine; and metal salts such as potassium acetate and zinc stearate. Dibutyltin dilaurate is a desirable example.

Other methods of adjusting the weight average molecular weight include adjusting the solid component concentration, reaction temperature, reaction catalyst, reaction time, and the like during the reaction.

The molecular weight distribution (Mw/Mn) of the polyurethane resin is desirably 1.0 to 2.5, preferably 1.5 to 2.0. A molecular weight distribution of equal to or lower than 2.5 is desirable in that good dispersion can be achieved with a low composition distribution.

As stated above, the urethane group concentration in the polyurethane resin of the present invention is desirably 2.5 to 4.5 mmol/g, preferably 3.0 to 4.0 mmol/g. A urethane group concentration of equal to or higher than 2.5 mmol/g is desirable in that good durability can be achieved without decreasing the Tg of the coating containing the polyurethane resin of the present invention as a binder component. A concentration of equal to or higher than 4.5 mmol/g is desirable in that good solvent solubility can be achieved and good dispersion properties can be obtained, facilitating control of the molecular weight.

The glass transition temperature (Tg) of the polyurethane resin of the present invention is desirably 80 to 200° C., preferably 90 to 160° C. A glass transition temperature of equal to or higher than 80° C. is desirable in that a film of high strength can be formed and durability and storage properties can be enhanced. A glass transition temperature of equal to or higher than 200° C. is desirable in that a coating with good calendering moldability can be obtained and a magnetic recording medium of good electromagnetic characteristics can be formed.

Further, the glass transition temperature (Tg) of the radiation-curable polyurethane resin is desirably 10 to 160° C., preferably 10 to 100° C. A glass transition temperature of equal to or higher than 10° C. is desirable in that good coating strength can be achieved following curing with radiation, and durability and storage properties can be enhanced. A glass transition temperature of equal to or higher than 160° C. is desirable in that calendering moldability can be good even when calendering is conducted after curing with radiation, and a magnetic recording medium with good electromagnetic characteristics can be formed.

The polar group content is desirably from $1\times10^{-5}$ to $2\times10^{-3}$ eq/g, preferably from $1\times10^{-5}$ to $1\times10^{-3}$ eq/g, and more preferably, from $1\times10^{-5}$ to $5\times10^{-4}$ eq/g. A polar group content of equal to or greater than $1\times10^{-5}$ eq/g is desirable in that adequate adsorptive strength to powder can be achieved and dispersion can be good. A polar group content of equal to or lower than $2\times10^{-3}$ eq/g is desirable in that good solubility in solvent can be achieved.

Since the compound denoted by general formula (1) can be employed as a polyol in the polyurethane resin of the present invention, it has a polar group in the form of —$SO_3M$. In this context, M is defined as above.

The polyurethane resin of the present invention may further comprise other polar groups.

Other polar groups in the form of —$OSO_3M$, —$PO_3M_2$, and —COOM are desirable. Of these, —$OSO_3M$ is preferred. M denotes a hydrogen atom or a monovalent cation. Examples of monovalent cations are alkali metals and ammonium.

A hydroxyl (OH) group can be contained in the polyurethane resin of the present invention. Two to twenty OH groups per molecule are desirable and 3 to 15 are preferred. When the number of OH groups desirably falls within this range, the coating strength and durability can be enhanced due to enhanced reactivity with the isocyanate curing agent, and dispersion can be good due to enhanced solubility in solvent.

Acrylic double bonds can be incorporated into the polyurethane resin of the present invention by using a diol having at least one acrylic double bond per molecule.

The content of double bonds (ethylenic unsaturated bonds) is desirably from $1\times10^{-5}$ to $2\times10^{-3}$ eq/g, preferably $1\times10^{-5}$ to $1\times10^{-3}$ eq/g, and more preferably, $1\times10^{-4}$ to $1\times10^{-3}$ eq/g.

A double bond content of equal to or greater than $1\times10^{-5}$ eq/g is desirable in that good coating strength can be achieved following curing with radiation. A double bond content of equal to or lower than $2\times10^{-3}$ eq/g is desirable in that calendering moldability can be good even when calendering is conducted after curing with radiation, and a magnetic recording medium with good electromagnetic characteristics can be formed.

Method of Manufacturing Polyurethane Resin

In the method of manufacturing polyurethane resin of the present invention, the mixture or solution composition of the present invention is subjected to a urethane producing reaction with an isocyanate compound. The details thereof are as set forth above.

Magnetic Recording Medium

The present invention relates to a magnetic recording medium comprising a magnetic layer comprising a ferromagnetic powder and a binder on a nonmagnetic support (referred to as "Medium 1" hereinafter), and a magnetic recording medium comprising a nonmagnetic layer comprising a nonmagnetic powder and a binder and a magnetic layer comprising a ferromagnetic powder and a binder in this order on a nonmagnetic support (referred to as "Medium 2" hereinafter).

In Medium 1, the binder comprised in the magnetic layer comprises the polyurethane resin of the present invention. In Medium 2, the binder comprised in the magnetic layer and/or the binder comprised in the nonmagnetic layer comprises the polyurethane resin of the present invention.

Medium 1 and Medium 2 will be collectively referred to as "the magnetic recording medium of the present invention" hereinafter.

The magnetic recording medium of the present invention will be described in greater detail below.

(Binder)

The magnetic recording medium of the present invention comprises the polyurethane resin of the present invention as the binder in the magnetic layer and/or nonmagnetic layer. In addition to the polyurethane resin of the present invention, binder components may be incorporated in the form of known thermoplastic resins, thermosetting resins, and reactive resins. Examples of thermoplastic resins are: polymers and copolymers containing structural units such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, and vinyl ether; and various rubber-based resins. Examples of thermosetting resins and reactive resins are: phenol resins, epoxy resins, polyurethane-cured resins, urea resins, melamine resins, alkyd resins, acrylic reaction resins, formaldehyde resins, silicone resins, epoxy-polyamide resins, mixtures of polyester resins and isocyanate polymers, mixtures of polyester polyols and polyisocyanates, and mixtures of polyurethanes and polyisocyanates. These resins are described in detail in the "Plastics Handbook" published by Asakura Shoten, which is expressly incorporated herein by reference in its entirety. Known electron-beam curable resins can also be employed in the various layers. These examples and methods for preparing them are described in detail in Japanese Unexamined Patent Publication (KOKAI) Showa No. 62-256219, which is expressly incorporated herein by reference in its entirety. The above resins may be employed singly or in combination.

In the magnetic recording medium, a thermosetting compound is normally employed as a curing agent (also referred to as a crosslinking agent) to crosslink and cure the binder resin and increase the coating strength. Polyisocyanates are widely employed as curing agents. The polyisocyanate is desirably in the form of a trifunctional or greater polyisocyanate. Specific examples are adduct polyisocyanate compounds such as the compound obtained by adding three moles of trilene diisocyanate (TDI) to trimethylol propane (TMP); the compound obtained by adding three moles of hexamethylene diisocyanate (HDI) to TMP; the compound obtained by adding three moles of isophorone diisocyanate (IPDI) to TMP; the compound obtained by adding three moles of xylylene diisocyanate (XDI) to TMP; condensation isocyanurate trimers of TDI, condensation isocyanurate pentamers of TDI, condensation isocyanurate heptamers of TDI, and mixtures thereof; isocyanurate condensates of HDI and isocyanurate condensates of IPDI; and crude MDI. Of these, compounds obtained by adding three moles of TDI to TMP and isocyanurate trimers of TDI are desirable.

Curing agents that are curable with radiation such as electron beams and ultraviolet radiation can be employed in addition to isocyanate curing agents. A curing agent having two or more, desirably three or more, radiation curable functional groups in the form of acryloyl groups or methacryloyl groups within the molecule is desirably employed. Examples are trimethylol propane (TMP) triacrylate, pentaerythritol tetraacrylate, and urethane acrylate oligomers. In this case, (meth)acryloyl groups are desirably incorporated into the binder in addition to a curing agent. For ultraviolet curing, a photosensitizing agent can be additionally employed.

From the perspective of maintaining dispersibility, the curing agent is desirably added in a proportion of equal to or more than 0 weight part but equal to or less than 80 weight parts per 100 weight parts of binder excluding the curing agent.

Binder is employed, for example, within a range of 5 to 50 weight percent, desirably within a range of 10 to 30 weight percent, of the nonmagnetic powder or ferromagnetic powder in the nonmagnetic layer or magnetic layer. The quantity of polyurethane resin of the present invention that is employed is desirably equal to or greater than 50 weight percent, preferably 60 to 100 weight percent, and more preferably, 70 to 100 weight percent, of the total binder. The content of the polyurethane resin of the present invention in the binder desirably falls within this range to achieve good dispersion.

(Magnetic Layer)

The magnetic layer comprises a ferromagnetic powder in addition to the binder.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500.000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter). In the measurement of powder size, the standard deviation/average value, expressed as a percentage, is defined as the coefficient of variation.

Acicular ferromagnetic powder, platelike magnetic powder, spherical magnetic powder, or elliptical magnetic powder can be employed as the ferromagnetic powder. Each of these will be described below.

(1) Acicular Ferromagnetic Powder

Examples of acicular ferromagnetic powders that can be employed as the ferromagnetic powder employed in the magnetic recording medium of the present invention are ferromagnetic metal powders such as acicular cobalt-containing ferromagnetic iron oxide and ferromagnetic alloy powders. The BET specific surface area ($S_{BET}$) of these powders is desirably equal to or greater than 40 m$^2$/g but equal to or lower than 80 m$^2$/g, preferably equal to or greater than 50 m$^2$/g but equal to or lower than 70 m$^2$/g. The crystallite size is desirably equal to or greater than 8 nm but equal to or lower than 25 nm, preferably equal to or greater than 9 nm but equal to or lower than 22 nm, and more preferably, equal to or greater than 10 nm but equal to or lower than 20 nm. The major axis length is desirably equal to or greater than 20 nm but equal to or lower than 50 nm and preferably equal to or greater than 20 nm but equal to or lower than 45 nm.

Examples of ferromagnetic powders are ferromagnetic metal powders such as yttrium-containing Fe, Fe—Co, Fe—Ni, and Co—Ni—Fe. The yttrium content of the ferromagnetic powder is desirably equal to or greater than 0.5 atomic percent but equal to or less than 20 atomic percent, preferably equal to or greater than 5 atomic percent but equal to or less than 10 atomic percent, as the ratio Y/Fe of yttrium atoms to iron atoms. A ratio of 0.5 atomic percent or greater is desirable in that a high $\alpha$s value can be achieved in the ferromagnetic powder, good magnetic characteristics can be obtained, and good electromagnetic characteristics can be attained. A ratio of 20 atomic percent or lower is desirable in that the iron content is suitable, good magnetic characteristics can be obtained, and good electromagnetic characteristics can be attained. Within a range of equal to or less than 20 atomic percent per 100 atomic percent of iron, it is possible to incorporate aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, and the like. The ferromagnetic metal powder may contain small quantities of water, hydroxides, or oxides.

An example of a method of manufacturing ferromagnetic powder in which cobalt or yttrium is incorporated that can be employed as the ferromagnetic powder will be described.

One example is to blow an oxidizing gas into an aqueous suspension of ferrous salt and an alkali to obtain iron oxyhydroxide, which is then used as a starting material.

The iron oxyhydroxide is desirably α-FeOOH. A first manufacturing method is to neutralize ferrous salt with an alkali hydroxide to obtain an aqueous suspension of $Fe(OH)_2$. An oxidizing gas is then blown into the suspension to obtain acicular-shaped α-FeOOH. A second manufacturing method is to neutralize ferrous salt with alkali carbonate to obtain an aqueous suspension of $FeCO_3$. An oxidizing gas is then blown into the suspension to obtain spindle-shaped α-FeOOH. Such iron oxyhydroxides are desirably obtained by reacting an aqueous solution of ferrous salt with an aqueous solution of an alkali to obtain an aqueous solution containing ferrous hydroxide. This aqueous solution is then oxidized by oxidation with air or the like. In this process, alkaline earth element salts such as Ni salt, Ca salt, Ba salt, and Sr salt, as well as Cr salt, Zn salt, and the like may be present in the ferrous salt aqueous solution. The particle shape (axial ratio) and the like may be adjusted by suitably selecting such salts.

Ferrous chloride, ferrous sulfate, and the like are desirable as the ferrous salt. Sodium hydroxide, ammonia water, ammonium carbonate, sodium carbonate, and the like are desirable as the alkali. Chlorides such as nickel chloride, calcium chloride, barium chloride, strontium chloride, chromium chloride, and zinc chloride are desirable as the salts that can be additionally present.

When incorporating cobalt onto iron, before incorporating yttrium, an aqueous solution of a cobalt compound such as cobalt sulfate or cobalt chloride is admixed to a slurry of the above-described ferrous oxyhydroxide. Once a slurry of iron oxyhydroxide containing cobalt has been prepared, an aqueous solution containing an yttrium compound is added to the slurry and stirred to complete the incorporation.

In addition to yttrium, it is possible to incorporate neodymium, samarium, praseodymium, lanthanum, gadolinium, and the like into the ferromagnetic powder. These can be incorporated using chlorides such as yttrium chloride, neodymium chloride, samarium chloride, praseodymium chloride, and lanthanum chloride; nitrates such as neodymium nitrate and gadolinium nitrate; and the like. Two or more of these may be employed in combination.

The coercivity (Hc) of the ferromagnetic metal powder is desirably equal to or greater than 159.2 kA/m but equal to or lower than 238.8 kA/m (equal to or greater than 2,000 Oe equal to or lower than 3,000 Oe), preferably equal to or greater than 1.67.2 kA/m but equal to or lower than 230.8 kA/m (equal to or greater than 2,100 Oe but equal to or lower than 2,900 Oe).

Further, the saturation flux density is desirably equal to or greater than 150 mT but equal to or lower than 300 mT (equal to or greater than 1,500 G but equal to or lower than 3,000 G), preferably equal to or greater than 160 mT but equal to or lower than 290 mT (equal to or greater than 600 G but equal to or lower than 2,900 G). The saturation magnetization (as) is desirably equal to or greater than 100 $A·m^2$/kg but equal to or lower than 170 $A·m^2$/kg (equal to or greater than 100 emu/g but equal to or lower than 170 emu/g), preferably equal to or greater than 110 $A·m^2$/kg but equal to or lower than 160 $A·m^2$/kg (equal to or greater than 110 emu/g but equal to or lower than 160 emu/g).

The lower the switching field distribution (SFD) of the magnetic powder itself, the better: equal to or lower than 0.8 is desirable. At an SFD of 0.8 or lower, electromagnetic characteristics can be good, output can be high, and magnetic reversal can be sharp with little peak shift. Such a level is suited to high-density digital recording. Methods of lowering the Hc distribution include improving the particle size distribution of goethite in the ferromagnetic metal powder, employing monodispersed α-$Fe_2O_3$, and preventing sintering between particles.

(2) Platelike Magnetic Powder

Hexagonal ferrite powder is desirable as a platelike magnetic powder employed as ferromagnetic powder.

Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, Zr, Zn and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The particle size is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording.

The plate ratio (plate diameter/plate thickness) is preferably equal to or greater than 1 but equal to or lower than 15, more preferably equal to or greater than 2 but equal to or lower than 7. Within the above range, adequate orientation can be achieved and noise can be decreased due to prevention of stacking between particles. The specific surface area by BET method of the hexagonal ferrite powders having such particle sizes normally ranges from 10 to 200 $m^2$/g, almost corresponding to an arithmetic value from the particle plate diameter and the plate thickness. Narrow distributions of particle plate diameter and thickness are normally good. Although difficult to render in number form, about 500 particles can be randomly measured in a transmission electron microscope (TEM) photograph of particles to make a comparison. This distribution is often not a normal distribution. However, when the distribution is expressed as the standard deviation a to the average particle size, a/average particle size=0.1 to 2.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercivity (Hc) of the hexagonal ferrite powder of about 500 to 5,000 Oe (about 39.8 to 398 kA/m) can normally be achieved. A high coercivity (Hc) is advantageous for high-density recording, but this is limited by the capacity of the recording head. The hexagonal ferrite powder employed in the present invention preferably has a coercivity (Hc) ranging from 800 to 4,000 Oe (about 63.7 to 318.4 kA/m), more preferably 1,500 to 3,500 Oe (about 119.4 to 278.6 kA/m). When the saturation magnetization of the head exceeds 1.4 tesla, the hexagonal ferrite having a coercivity (Hc) of equal to or higher than 2,200 Oe (about equal to or higher than 159.2 kA/m) is preferably employed.

The coercivity (Hc) can be controlled by particle size (plate diameter and plate thickness), the types and quantities of elements contained, substitution sites of the element, the particle producing reaction conditions, and the like. The saturation magnetization ($\sigma_s$) can be 40 to 80 A·m²/kg (40 to 80 emu/g). The higher saturation magnetization ($\sigma_s$) is preferred, however, it tends to decrease with decreasing particle size. Known methods of improving saturation magnetization ($\sigma_s$) are combining spinel ferrite with magnetoplumbite ferrite, selection of the type and quantity of elements incorporated, and the like. It is also possible to employ W-type hexagonal ferrite.

When dispersing the hexagonal ferrite powder, the surface of the hexagonal ferrite powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added can range from 0.1 to 10 weight percent relative to the weight of the hexagonal ferrite powder. The pH of the hexagonal ferrite powder can also be important to dispersion. A pH of about 4 to 12 is usually optimum for the dispersion medium and polymer. From the perspective of the chemical stability and storage properties of the medium, a pH of about 6 to 10 can be selected. Moisture contained in the hexagonal ferrite powder also affects dispersion. There is an optimum level for the dispersion medium and polymer, usually selected from the range of 0.01 to 2.0 weight percent.

Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention.

(3) Spherical and Elliptical Magnetic Powder

An iron nitride-based ferromagnetic powder with $Fe_{16}N_2$ as the primary phase is desirable as a spherical or elliptical magnetic powder. In the iron nitride-based ferromagnetic powder, atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb can be incorporated in addition to Fe and N atoms. The content of N relative to Fe is desirably equal to or greater than 1.0 atomic percent, but equal to or less than 20.0 atomic percent.

A spherical or elliptical shape is desirable for iron nitride, with an axial ratio of the major axis diameter/minor axis diameter of equal to or greater than 1 but equal to or lower than 2 being desirable. The BET specific surface area ($S_{BET}$) is desirably equal to or greater than 30 m²/g but equal to or lower than 100 m²/g, preferably equal to or greater than 50 m²/g but equal to or lower than 70 m²/g. The crystallite size is desirably equal to or greater than 12 nm but equal to or lower than 25 nm, preferably equal to or greater than 13 nm but equal to or lower than 22 nm.

The saturation magnetization $\sigma_s$ is desirably equal to or greater than 50 A·m²/kg (50 emu/g) but equal to or lower than 200 A·m²/kg (200 emu/g), preferably equal to or greater than 70 A·m²/kg (70 emu/g) but equal to or lower than 150 A·m²/kg (150 emu/g).

(Nonmagnetic Layer)

Medium 2 comprises a nonmagnetic layer comprising a nonmagnetic powder and a binder between a nonmagnetic support and a magnetic layer. The binder in the magnetic layer and/or nonmagnetic layer comprises the above-described polyurethane.

The nonmagnetic powder employed in the nonmagnetic layer can be an organic or inorganic substance. Examples of inorganic substances are: metals, metal oxides, metal carbonates, metal sulfates, metal nitrides, metal carbides, and metal sulfides. Carbon black may also be employed.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Within a range of 5 nm to 2 μm, dispersion can be good and good surface roughness can be achieved; the above range is preferred.

The specific surface area of the nonmagnetic powder desirably ranges from 1 to 100 m²/g, preferably from 5 to 70 m²/g, and more preferably from 10 to 65 m²/g. Within the specific surface area ranging from 1 to 100 m²/g, suitable surface roughness can be achieved and dispersion is possible with the desired quantity of binder; the above range is preferred.

Oil absorption capacity using dibutyl phthalate (DBP) preferably ranges from 5 to 100 mL/100 g, more preferably from 10 to 80 mL/100 g, and further preferably from 20 to 60 mL/100 g.

The specific gravity desirably ranges from 1 to 12, preferably from 3 to 6. The tap density desirably ranges from 0.05 to 2 g/mL, preferably from 0.2 to 1.5 g/mL. A tap density falling within a range of 0.05 to 2 g/mL can reduce the amount of scattering particles, thereby facilitating handling, and tends to prevent solidification to the device.

The pH of the nonmagnetic powder preferably ranges from 2 to 11, more preferably from 6 to 9. When the pH falls within a range of 2 to 11, the coefficient of friction does not become high at high temperature or high humidity or due to the freeing of fatty acids.

The moisture content of the nonmagnetic powder desirably ranges from 0.1 to 5 weight percent, preferably from 0.2 to 3 weight percent, and more preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 $\mu mol/m^2$, more preferably from 2 to 15 $\mu mol/m^2$. The heat of wetting in 25° C. water of the nonmagnetic powder is preferably within a range of 200 to 600 $erg/cm^2$ (20 to 60 $\mu J/cm^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9.

The surface of these nonmagnetic powders preferably contains $Al_2O_3$, $SiO_2$, $TiO_2$, $ZrO_2$, $SnO_2$, $Sb_2O_3$, and ZnO by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Specific examples of nonmagnetic powders suitable for use in the nonmagnetic layer are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, T-600B, T-100F and T-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

(Carbon Black)

The magnetic recording medium of the present invention can comprise carbon black in the magnetic layer and/or nonmagnetic layer. Examples of types of carbon black that are suitable for use are: furnace black for rubber, thermal for rubber, black for coloring and acetylene black. A specific surface area of 5 to 500 $m^2/g$, a DBP oil absorption capacity of 10 to 400 ml/100 g, and an average particle size of 5 to 300 nm, preferably 10 to 250 nm, more preferably 20 to 200 nm are respectively desirable. A pH of 2 to 10, a moisture content of 0.1 to 10 percent, and a tap density of 0.1 to 1 g/cc are respectively desirable. Specific examples of types of carbon black employed are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the coating liquid. These carbon blacks may be used singly or in combination. The quantity of carbon black preferably ranges from 0.1 to 30 weight percent relative to the ferromagnetic powder or nonmagnetic powder, when carbon black is employed. In the magnetic layer, carbon black can work to prevent static, reduce the coefficient of friction (impart smoothness), impart light-blocking properties, enhance film strength, and the like; the properties vary with the type of carbon black employed. Carbon black can be mixed into the nonmagnetic layer to achieve the known effect of reducing surface resistivity Rs and optical transmittance, and achieving a desired micro-Vicker's hardness. A lubricant stockpiling effect can also be achieved by incorporating carbon black into the nonmagnetic layer. Accordingly, based on characteristics required for the magnetic layer and nonmagnetic layer, different types of carbon black can be employed in the magnetic layer and nonmagnetic layer in light of various characteristics such as types, quantities, particle size, oil absorption capacity, electrical conductivity, and pH. The carbon black is preferably optimized for each layer. For example, *Carbon Black Handbook* compiled by the Carbon Black Association, which is expressly incorporated herein by reference in its entirety, may be consulted for types of carbon black suitable for use in the magnetic layer and/or nonmagnetic layer.

(Abrasives)

Known materials chiefly having a Mohs' hardness of 6 or greater may be employed either singly or in combination as abrasives in the present invention. These include: α-alumina with an α-conversion rate of equal to or greater than 90 percent, β-alumina, silicon carbide, chromium oxide, cerium oxide, α-iron oxide, corundum, synthetic diamond, silicon nitride, silicon carbide, titanium carbide, titanium oxide, silicon dioxide, and boron nitride. Complexes of these abrasives (obtained by surface treating one abrasive with another) may also be employed. There are cases in which compounds or elements other than the primary compound are contained in these abrasives; the effect does not change so long as the content of the primary compound is equal to or greater than 90 weight percent. The average particle size of the abrasive is preferably 0.01 to 2 micrometers, more preferably 0.05 to 1.0 micrometer, and further preferably, 0.05 to 0.5 micrometer. To enhance electromagnetic characteristics, a narrow particle size distribution is desirable. Abrasives of differing particle size may be incorporated as needed to improve durability; the same effect can be achieved with a single abrasive as with a wide particle size distribution. It is preferable that the tap density is 0.3 to 2 g/cc, the moisture content is 0.1 to 5 percent, the pH is 2 to 11, and the specific surface area is 1 to 30 $m^2$/g. The shape of the abrasive employed in the present invention may be acicular, spherical, cubic, or the like. However, a shape comprising an angular portion is desirable due to high abrasiveness. Specific examples are AKP-12, AKP-15, AKP-20, AKP-30, AKP-50, HIT-20, HIT-30, HIT-55, HIT-60, HIT-70, HIT-80, and HIT-100 made by Sumitomo Chemical Co., Ltd.; ERC-DBM, HP-DBM, and HPS-DBM made by Reynolds Corp.; WA10000 made by Fujimi Abrasive Corp.; UB20 made by Uemura Kogyo Corp.; G-5, Chromex U2, and Chromex U1 made by Nippon Chemical Industrial Co., Ltd.; TF100 and TF140 made by Toda Kogyo Corp.; Beta Random Ultrafine made by Ibiden Co., Ltd.; and B-3 made by Showa Kogyo Co., Ltd. Abrasives may be added as needed to the nonmagnetic layer. Addition of abrasives to the nonmagnetic layer can be done to control surface shape, control how the abrasive protrudes, and the like. The particle size and quantity of the abrasives added to the magnetic layer and nonmagnetic layer are preferably set to optimal values.

(Additives)

Substances having lubricating effects, antistatic effects, dispersive effects, plasticizing effects, or the like may be employed as additives in the magnetic layer and nonmagnetic layer. Examples of additives are: molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkylsulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of the additives in the form of fatty acids are: capric acid, caprylic acid, lauric acid, myristic acid, palmitic acid, stearic acid, behenic acid, oleic acid, elaidic acid, linolic acid, linolenic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.), which is expressly incorporated herein by reference in its entirety. These lubricants, antistatic agents and the like need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent.

The lubricants and surfactants suitable for use in the present invention each have different physical effects. The type, quantity, and combination ratio of lubricants producing synergistic effects can be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. In general, the total amount of lubricant can be 0.1 to 50 weight percent, and preferably 2 to 25 weight percent with respect to the ferromagnetic powder or nonmagnetic powder.

Known organic solvents can be used. Examples of the organic solvents are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio.

All or a portion of the additives employed in the present invention can be added during any step in the manufacturing of a magnetic layer coating liquid and nonmagnetic layer coating liquid. For example, there are times when they are mixed with the ferromagnetic powder before the kneading step, times when they are added with the ferromagnetic powder, binder and solvent in the kneading step, times when they are added during the dispersing step, times when they are added after the dispersing step, and times when they are added immediately prior to coating. Based on the objective, there are times when an objective is achieved by coating all or part of the additives in simultaneous or successive coatings after coating the magnetic layer. Based on the objective, there are times when a lubricant is coated to the magnetic layer surface after calendering or slitting has been completed. Known organic solvents can be employed in the present invention. For example, the solvents described in Japanese Unexamined Patent Publication (KOKAI) Showa No. 6-68453, which is expressly incorporated herein by reference in its entirety, can be employed.

(Layer Structure)

In the magnetic recording medium of the present invention, the thickness of the nonmagnetic support ranges from, for example, 2 to 100 µm, preferably from 2 to 80 µm. For computer-use magnetic recording tapes, the nonmagnetic support having a thickness of 3.0 to 6.5 µm, preferably 3.0 to 6.0 µm, more preferably 4.0 to 5.5 µm is suitably employed.

An undercoating layer can be provided between the nonmagnetic support and nonmagnetic layer to enhance adhesion. The undercoating layer is, for example, 0.01 to 0.5 µm, desirably 0.02 to 0.5 µm, in thickness. The magnetic recording medium of the present invention may be a disk-shaped medium in which a nonmagnetic layer and a magnetic layer are provided on both surfaces of the support, or a tape-shaped or disk-shaped medium in which they are provided only on one side thereof. In such cases, a backcoat layer may be provided on the opposite side from the side on which the nonmagnetic layer and magnetic layer are provided to achieve the effects of preventing charge buildup, correcting for curling, and the like. The thickness of the backcoat layer is, for example, 0.1 to 4 µm, desirably 0.3 to 2.0 µm. Known undercoating layers and the backcoat layers can be employed.

The thickness of the nonmagnetic layer is normally 0.2 to 5.0 µm, preferably 0.3 to 3.0 µm, and further preferably, 0.4 to 2.0 µm.

The thickness of the magnetic layer is desirably optimized based on the saturation magnetization of the head employed, the length of the head gap, and the recording signal band, and is preferably 30 to 150 nm, more preferably 50 to 120 nm, and further preferably, 60 to 100 nm. The thickness variation in the magnetic layer is preferably within ±50 percent, more preferably within ±30 percent. At least one magnetic layer is sufficient. The magnetic layer may be divided into two or more layers having different magnetic characteristics, and a known configuration relating to multilayered magnetic layer may be applied.

(Backcoat Layer)

Generally, stronger repeat running properties are demanded of magnetic recording media (magnetic tapes) for use in recording computer data than of audio and video tapes. To maintain such high running durability, carbon black and inorganic powder are desirably incorporated into a backcoat layer.

An example of an inorganic powder that can be added to the backcoat layer is an inorganic powder with a Mohs' hardness of 5 to 9 and an average particle size of 80 to 250 nm. Examples of inorganic powders that can be employed are α-iron oxide, α-alumina, chromium oxide ($Cr_2O_3$), and $TiO_2$. Of these, the use of α-iron oxide and α-alumina is desirable.

The carbon blacks that are commonly employed in magnetic recording media can be widely employed in the backcoat layer. For example, furnace black for rubber, thermal for rubber, black for coloring and acetylene black can be employed. To prevent the transfer of backcoat layer nonuniformities to the magnetic layer, the average particle size of the carbon black is desirably equal to or lower than 0.3 µm, preferably 0.01 to 0.1 µm. The quantity of carbon black employed in the backcoat layer is desirably such that the optical transmission density (the transmission level of a TR-927 made by Macbeth) falls within a range of equal to or lower than 2.0.

The use of two carbon blacks of differing average particle size is advantageous to improve running durability. In that case, the combination of a first carbon black having an average particle size falling within a range of 0.01 to 0.04 µm and a second carbon black having an average particle size falling within a range of 0.05 to 0.3 µm is desirable. The quantity of the second carbon black is suitably 0.1 to 10 weight parts, desirably 0.3 to 3 weigh parts, per 100 weight parts of the inorganic powder and the first carbon black combined. The quantity of binder employed can be selected within a range of 10 to 40 weight parts, preferably 20 to 32 weight parts, per 100 weight parts of the inorganic powder and carbon black combined. Conventionally known thermoplastic resins, thermosetting resins, reactive resins, and the like can be employed as the binder in the backcoat layer.

(Nonmagnetic Support)

Known films of the following may be employed as the nonmagnetic support: polyethylene terephthalate, polyethylene naphthalate, other polyesters, polyolefins, cellulose triacetate, polycarbonate, polyamides, polyimides, polyamidoimides, polysulfones, aromatic polyamides, polybenzooxazoles, and the like. Supports having a glass transition temperature of equal to or higher than 100° C. are preferably employed. The use of polyethylene naphthalate, aramid, or some other high-strength support is particularly desirable. As needed, layered supports such as disclosed in Japanese Unexamined Patent Publication (KOKAI) Heisei No. 3-224127, which is expressly incorporated herein by reference in its entirety, may be employed to vary the surface roughness of the magnetic surface and support surface. These supports may be subjected beforehand to corona discharge treatment, plasma treatment, adhesion enhancing treatment, heat treatment, dust removal, and the like.

The center surface average surface roughness (Ra) of the nonmagnetic support as measured with an optical interferotype surface roughness meter HD-2000 made by WYKO is preferably equal to or less than 8.0 nm, more preferably equal to or less than 4.0 nm, further preferably equal to or less than 2.0 nm. Not only does such a support desirably have a low center surface average surface roughness (Ra), but there are also desirably no large protrusions equal to or higher than 0.5 µm. The surface roughness shape may be freely controlled through the size and quantity of filler added to the support as needed. Examples of such fillers are oxides and carbonates of elements such as Ca, Si, and Ti, and organic powders such as acrylic-based one. The support desirably has a maximum height $R_{max}$ equal to or less than 1 µm, a ten-point average roughness $R_Z$ equal to or less than 0.5 µm, a center surface peak height $R_P$ equal to or less than 0.5 µm, a center surface valley depth $R_V$ equal to or less than 0.5 µm, a center-surface surface area percentage Sr of 10 percent to 90 percent, and an average wavelength $\lambda_a$ of 5 to 300 µm. To achieve desired electromagnetic characteristics and durability, the surface protrusion distribution of the support can be freely controlled with fillers. It is possible to control within a range from 0 to 2,000 protrusions of 0.01 to 1 µm in size per 0.1 mm².

The F-5 value of the nonmagnetic support suitable for use in the present invention desirably ranges from 5 to 50 kg/mm², approximately 49 to 490 MPa. The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 5 to 100 kg/mm², approximately 49 to 980 MPa. The modulus of elasticity preferably ranges from 100 to 2,000 kg/mm², approximately 0.98 to 19.6 GPa. The thermal expansion coefficient preferably ranges from $10^4$ to $10^{-8}/°$ C., more preferably from $10^{-5}$ to $10^{-6}/°$ C. The moisture expansion coefficient is preferably equal to or less than $10^{-4}/RH$ percent, more preferably equal to or less than $10^{-5}/RH$ percent. These thermal characteristics, dimensional characteristics, and mechanical strength characteristics are desirably nearly equal, with a difference equal to less than 10 percent, in all in-plane directions in the support.

(Preparation of Coating Liquid)

The process for manufacturing coating liquids for magnetic and nonmagnetic layers can comprise at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 weight percent of the entire quantity of binder) can be kneaded in a range of 15 to 500 parts per 100 parts of the ferromagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for magnetic and nonmagnetic layers, with a dispersing medium with a high specific gravity such as zirconia beads, titania beads, and steel beads being suitable for use. The particle diameter and fill ratio of these dispersing media can be optimized for use. A known dispersing device may be employed.

In the method of manufacturing a magnetic recording medium, for example, a magnetic layer can be formed by coating a magnetic layer coating liquid to a prescribed thickness on the surface of a nonmagnetic support that is being run. Multiple magnetic layer coating liquids can be successively or simultaneously coated in a multilayer coating, or a nonmagnetic layer coating liquid and a magnetic layer coating liquid can be successively or simultaneously coated in a multilayer coating. Coating machines suitable for use in coating the magnetic layer or nonmagnetic layer coating liquid are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard. The content of the above publication is expressly incorporated herein by reference in its entirety.

For a magnetic tape, the coating layer that is formed by applying the magnetic layer coating liquid can be magnetic field orientation processed using cobalt magnets or solenoids on the ferromagnetic powder contained in the coating layer. In the case of a disk, adequately isotropic orientation can sometimes be achieved with no orientation without using an orienting device. However, the diagonal arrangement of cobalt magnets in alternating fashion or the use of a known random orienting device such as a solenoid to apply an a.c. magnetic field is desirable. In the case of a ferromagnetic metal powder, the term "isotropic orientation" generally means randomness in the two in-plane dimensions, but can also be three-dimensional randomness when the vertical component is included. A known method such as magnets with opposite poles positioned opposite each other can also be employed to impart isotropic magnetic characteristics in a circumferential direction by effecting vertical orientation. When conducting particularly high-density recording, vertical orientation is desirable. Spin coating can also be employed to effect circumferential orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

The coated stock material obtained in this manner is normally temporarily rolled on a pickup roll, and after a period, wound off the pickup roll and subjected to calendering.

In calendering, super calender rolls or the like can be employed. Calendering can enhance the smoothness of the surface, eliminate voids produced by removing the solvent during drying, and increase the fill rate of ferromagnetic powder in the magnetic layer, yielding a magnetic recording medium with good electromagnetic characteristics. The calendering step is desirably conducted by varying the calendering conditions based on the smoothness of the surface of the coated stock material.

The surface smoothness of the coated stock material can be controlled by means of the calender roll temperature, calender roll speed, and calender roll tension. The calender roll pressure and calender roll temperature are desirably controlled by taking into account the characteristics of the particulate medium. Lowering the calender roll pressure or calender roll temperature can decrease the surface smoothness of the final product. Conversely, raising the calender roll pressure or calender roll temperature can increase the surface smoothness of the final product.

Additionally, following the calendering step, the magnetic recording medium can be thermally processed to cause thermosetting to proceed. Such thermal processing can be suitably determined based on the blending formula of the magnetic layer coating liquid. An example is 35 to 100° C., desirably 50 to 80° C. The thermal processing period is, for example, 12 to 72 hours, desirably 24 to 48 hours.

Calender rolls made of epoxy, polyimide, polyamide, polyamideimide, and other heat-resistant plastic rolls can be employed. Processing can also be conducted with metal rolls.

Among the calendering conditions, the calender roll temperature, for example, falls within a range of 60 to 100° C., desirably a range of 70 to 100° C., and preferably a range of 80 to 100° C. The pressure, for example, falls within a range of 100 to 500 kg/cm (approximately 98 to 490 kN/m), preferably a range of 200 to 450 kg/cm (approximately 196 to 441 kN/m), and preferably a range of 300 to 400 kg/cm (approximately 294 to 392 kN/m). To increase the smoothness of the magnetic layer surface, the nonmagnetic layer surface can also be calendered. Calendering of the nonmagnetic layer is also desirably conducted under the above conditions.

The magnetic recording medium that is obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like can be suitably selected.

Physical Characteristics

Extremely good surface smoothness can be achieved in the magnetic recording medium of the present invention by incorporating the above polyurethane resin as a constituent component of the binder. The surface smoothness of the magnetic recording medium of the present invention desirably falls within a range of 0.1 to 4 nm, preferably 1 to 3 nm, as the center surface average roughness of the magnetic layer surface. The ten-point average roughness $R_z$ on the surface of the magnetic layer is desirably equal to or less than 30 nm. The surface properties of the magnetic layer can be controlled by means of fillers added to the support, the surface shape of calender rolls, and the like. Curling is preferably controlled to within ±3 mm.

The saturation magnetic flux density of the magnetic layer preferably ranges from 100 to 400 mT. The coercivity (Hc) of the magnetic layer is preferably 143.2 to 318.3 kA/m (approximately 1,800 to 4,000 Oe), more preferably 159.2 to 278.5 kA/m (approximately 2,000 to 3,500 Oe). Narrower coercivity distribution is preferable. The SFD and SFDr are preferably equal to or lower than 0.6, more preferably equal to or lower than 0.3.

The coefficient of friction of the magnetic recording medium of the present invention relative to the head is, for example, equal to or less than 0.50 and preferably equal to or less than 0.3 at temperatures ranging from −10° C. to 40° C. and humidity ranging from 0 percent to 95 percent, the surface resistivity on the magnetic surface preferably ranges from $10^4$ to $10^8$ ohm/sq, and the charge potential preferably ranges from −500 V to +500 V. The modulus of elasticity at 0.5 percent extension of the magnetic layer preferably ranges from 0.98 to 19.6 GPa (approximately 100 to 2,000 kg/mm$^2$) in each in-plane direction. The breaking strength preferably ranges from 98 to 686 MPa (approximately 10 to 70 kg/mm$^2$). The modulus of elasticity of the magnetic recording medium preferably ranges from 0.98 to 14.7 GPa (approximately 100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz) of the magnetic layer preferably ranges from 50 to 180° C., and that of the nonmagnetic layer preferably ranges from 0 to 180° C. The loss elastic modulus preferably falls within a range of $1×10^7$ to $8×10^8$ Pa (approximately $1×10^8$ to $8×10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

When the magnetic recording medium of the present invention comprises both a magnetic layer and a nonmagnetic layer, physical properties of the nonmagnetic layer and magnetic layer may be varied based on the objective. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

EXAMPLES

The present invention will be described in detail below based on Examples. However, the present invention is not limited to the examples. The "parts" and "percent" given in Examples are weight parts and weight percent unless specifically stated otherwise.

The solid components given below were measured by the following methods.

A 1.0 g quantity of sample was dried under conditions of 180° C./30 minutes. After drying, the weight was adopted as the solid component.

1. Examples and Comparative Examples of the Mixture and the Solution Composition Example 1

One hundred parts of 2-aminoethanesulfonic acid and 26.8 parts of lithium hydroxide monohydrate were added to 250 parts of water and the mixture was stirred for 30 minutes at 45° C. To this were added 156 parts of 1,2-butylene oxide, and the mixture was stirred for 2 hours at 45° C. After adding 400 parts of toluene and stirring for 10 minutes, the mixture was left standing and the lower layer was fractionated. The lower layer obtained was solidified and dried, yielding a mixture of sulfonate group-containing compound (S-1) and an acid form in which the lithium in (S-1) was hydrogen atoms. The mixture ratio (weight ratio) of Example Compound (S-1) (base form) and the acid form calculated from the quantities used in preparation was base form:acid form=80:20.

Example 2

The 26.8 parts of lithium hydroxide monohydrate employed were replaced with 25.6 parts of sodium hydroxide and the same operation was conducted as in Example 1 to obtain a mixture of Example Compound (S-19) and an acid form in which the sodium in (S-19) was hydrogen atoms. The mixture ratio (weight ratio) of Example Compound (S-19) (base form) and the acid form calculated from the quantities used in preparation was base form:acid form=80:20.

Example 3

The 26.8 parts of lithium hydroxide monohydrate employed were replaced with 37.8 parts of potassium hydroxide (95 percent purity) and the same operation was conducted as in Example 1 to obtain a mixture of Example Compound (S-20) and an acid form in which the sodium in (S-20) was hydrogen atoms. The mixture ratio (weight ratio) of Example Compound (S-20) (base form) and the acid form calculated from the quantities used in preparation was base form:acid form=80:20.

Comparative Example 1

The 26.8 parts of lithium hydroxide monohydrate were replaced with 33.5 parts of lithium hydroxide and the same operation was conducted as in Example 1 to obtain Example Compound (S-1).

Comparative Example 2

The quantity of sodium hydroxide employed was changed to 32.0 parts and the same operation was conducted as in Example 2 to obtain Example Compound (S-19).

Comparative Example 3

The quantity of potassium hydroxide (95 percent purity) employed was changed to 47.2 parts and the same operation was conducted as in Example 3 to obtain Example Compound (S-20).

Example 4

One hundred parts of 2-aminoethanesulfonic acid and 26.8 parts of lithium hydroxide monohydrate were added to 250 parts of water and the mixture was stirred for 30 minutes at 45° C. To this were added 282 parts of butyl glycidyl ether, and the mixture was stirred for 2 hours at 45° C. After adding 400 parts of toluene and stirring for 10 minutes, the mixture was left standing and the lower layer was fractionated. The lower layer obtained was solidified and dried, yielding a mixture of an Example Compound (S-2) and an acid form in which the lithium in (S-2) was hydrogen atoms. The mixture ratio (weight ratio) of Example Compound (S-2) (base form) and the acid form calculated from the quantities used in preparation was base form:acid form=80:20.

Example 5

The 26.8 parts of lithium hydroxide monohydrate employed were replaced with 25.6 parts of sodium hydroxide and the same operation was conducted as in Example 4 to obtain a mixture of Example Compound (S-21) and an acid form in which the sodium in (S-21) was hydrogen atoms. The mixture ratio (weight ratio) of Example Compound (S-21) (base form) and the acid form calculated from the quantities used in preparation was base form:acid form=80:20.

Example 6

The 26.8 parts of lithium hydroxide monohydrate employed were replaced with 37.8 parts of potassium hydroxide (95 percent purity) and the same operation was conducted as in Example 4 to obtain a mixture of Example Compound (S-22) and an acid form in which the potassium in (S-22) was hydrogen atoms. The mixture ratio (weight ratio) of Example Compound (S-22) (base form) and the acid form calculated from the quantities used in preparation was base form:acid form=80:20.

Comparative Example 4

The 26.8 parts of lithium hydroxide monohydrate were replaced with 33.5 parts of lithium hydroxide and the same operation was conducted as in Example 4 to obtain Example Compound (S-2).

Comparative Example 5

The quantity of sodium hydroxide employed was changed to 32.0 parts and the same operation was conducted as in Example 5 to obtain Example Compound (S-21).

Comparative Example 6

The quantity of potassium hydroxide (95 percent purity) employed was changed to 37.8 parts and the same operation was conducted as in Example 6 to obtain Example Compound (S-22).

Example 7

To 1.0 part of Example Compound (S-1) obtained in Comparative Example 1 were added 0.21 part of acetic acid and 0.79 part of toluene to prepare a solution with 50 percent solid component.

Example 8

To 1.0 part of Example Compound (S-19) obtained in Comparative Example 2 were added 0.21 part of acetic acid and 0.79 part of toluene to prepare a solution with 50 percent solid component.

Example 9

To 1.0 part of Example Compound (S-20) obtained in Comparative Example 3 were added 0.20 part of acetic acid and 0.80 part of toluene to prepare a solution with 50 percent solid component.

Example 10

To 1.0 part of Example Compound (S-2) obtained in Comparative Example 4 were added 0.15 part of acetic acid and 0.85 part of toluene to prepare a solution with 50 percent solid component.

Example 11

To 1.0 part of (S-21) obtained by the method of the Example Compound obtained in Comparative Example 5 were added 0.15 part of acetic acid and 0.85 part of toluene to prepare a solution with 50 percent solid component.

Example 12

To 1.0 part of Example Compound (S-22) obtained in Comparative Example 6 were added 0.14 part of acetic acid and 0.86 part of toluene to prepare a solution with 50 percent solid component.

Example 13

With the exception that the 0.79 part of toluene was replaced with 0.79 part of cyclohexanone, a solution with 50 percent solid component was prepared by the same method as in Example 7.

Example 14

With the exception that the 0.79 part of toluene was replaced with 0.79 part of cyclohexanone, a solution with 50 percent solid component was prepared by the same method as in Example 8.

Example 15

With the exception that the 0.80 part of toluene was replaced with 0.80 part of cyclohexanone, a solution with 50 percent solid component was prepared by the same method as in Example 9.

Example 16

With the exception that the 0.85 part of toluene was replaced with 0.85 part of cyclohexanone, a solution with 50 percent solid component was prepared by the same method as in Example 10.

Example 17

With the exception that the 0.85 part of toluene was replaced with 0.85 part of cyclohexanone, a solution with 50 percent solid component was prepared by the same method as in Example 11.

Example 18

With the exception that the 0.86 part of toluene was replaced with 0.86 part of cyclohexanone, a solution with 50 percent solid component was prepared by the same method as in Example 12.

Example 19

With the exceptions that the 0.21 part of acetic acid and 0.79 part of toluene were replaced with 0.52 part of octanoic acid and 0.48 part of toluene, a solution with 50 percent solid component was prepared by the same method as in Example 7.

Example 20

With the exceptions that the 0.21 part of acetic acid and 0.79 part of toluene were replaced with 0.49 part of octanoic acid and 0.61 part of toluene, a solution with 50 percent solid component was prepared by the same method as in Example 8.

Example 21

With the exceptions that the 0.21 part of acetic acid and 0.79 part of toluene were replaced with 0.47 part of octanoic acid and 0.53 part of toluene, a solution with 50 percent solid component was prepared by the same method as in Example 9.

Example 22

With the exceptions that the 0.21 part of acetic acid and 0.79 part of toluene were replaced with 0.37 part of octanoic acid and 0.63 part of toluene, a solution with 50 percent solid component was prepared by the same method as in Example 10.

Example 23

With the exceptions that the 0.21 part of acetic acid and 0.79 part of toluene were replaced with 0.35 part of octanoic acid and 0.65 part of toluene, a solution with 50 percent solid component was prepared by the same method as in Example 11.

Example 24

With the exceptions that the 0.21 part of acetic acid and 0.79 part of toluene were replaced with 0.34 part of octanoic acid and 0.66 part of toluene, a solution with 50 percent solid component was prepared by the same method as in Example 12.

Identification of the Product

NMR data and data assignment for the mixture obtained in Example 1 are given below. A 400 MHz NMR (AVANCE 11-400 made by BRUKER) was employed in the $^1$H NMR measurement conducted in the present Example.

$^1$H NMR ($D_2O$=4.75 ppm) δ (ppm)=3.68 (2H, m), 3.10 (2H, m), 2.59 (2H, m), 2.40 (4H, m), 1.45 (4H, m), 0.89 (6H, t).

$^1$H NMR data and data assignment for Example Compound (S-1) obtained in Comparative Example 1 are given below.

$^1$H NMR ($D_2O$=4.75 ppm) δ (ppm)=3.68 (2H, m), 3.10 (2H, m), 2.59 (2H, m), 2.40 (4H, m), 1.45 (4H, m), 0.89 (6H, t).

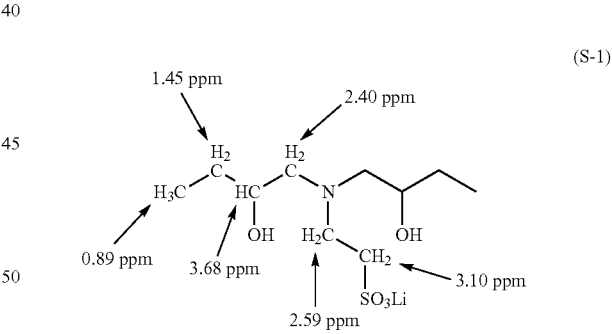

(S-1)

$^1$H NMR data for the mixture obtained in Example 7 are given below.

$^1$H NMR ($D_2O$=4.75 ppm) δ (ppm)=3.68 (2H, m), 3.10 (2H, m), 2.59 (2H, m), 2.40 (4H, m), 1.91 (1.2H,$), 1.45 (4H, m), 0.89 (6H, t).

In Example 7, no proton shift was observed in $^1$H NMR following the addition of acetic acid. $^1$H NMR data and data assignment for acetic acid are given below.

Acetic acid: 1.91 (1.2H, s)

NMR data and data assignment for the mixture obtained in Example 4 are given below.

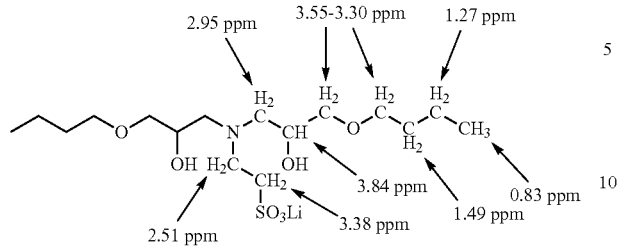

(S-2)

$^1$H NMR (D$_2$O=4.75 ppm) δ (ppm)=3.84 (2H, m), 3.55-3.30 (8H, m), 3.38 (2H, m), 2.95 (4H, m), 2.51 (2H, m), 1.49 (4H, m), 1.27 (4H, m), 0.83 (6H, t).

Examples 25 to 30

One part of each of the mixtures obtained in Examples 1 to 6 was separately dissolved in one part of toluene to obtain solutions with 50 percent solid component.

Examples 31 to 36

One part of each of the mixtures obtained in Examples 1 to 6 was separately dissolved in one part of cyclohexanone to obtain solutions with 50 percent solid component.

Comparative Examples 7 to 12

One part of each of Example Compound obtained in Comparative Examples 1 to 6 was separately dissolved in one part of toluene to obtain solutions with 50 percent solid component.

Evaluation of Solution Stability

The pH of each of the solutions obtained in Examples 7 to 36 was measured within one day of preparation and two months after preparation. The results are given in Table 1 below. Visual observation of the solutions obtained revealed them to be transparent.

TABLE 1

| Solution | Example Compound (sulfonate group-containing compound) | Protonic acid | Organic solvent | pH Within one day | pH After two months | Change in pH over time |
|---|---|---|---|---|---|---|
| Ex.25 | (S-1) | Acid form | Toluene | 8 | 7.9 | 0.1 |
| Ex.26 | (S-19) | Acid form | Toluene | 8 | 8 | 0 |
| Ex.27 | (S-20) | Acid form | Toluene | 8 | 8 | 0 |
| Ex.28 | (S-2) | Acid form | Toluene | 8 | 7.9 | 0.1 |
| Ex.29 | (S-21) | Acid form | Toluene | 7.8 | 7.7 | 0.1 |
| Ex.30 | (S-22) | Acid form | Toluene | 8 | 8 | 0 |
| Ex.31 | (S-1) | Acid form | Cyclohexanone | 8 | 7.9 | 0.1 |
| Ex.32 | (S-19) | Acid form | Cyclohexanone | 8 | 8 | 0 |
| Ex.33 | (S-20) | Acid form | Cyclohexanone | 8 | 8 | 0 |
| Ex.34 | (S-2) | Acid form | Cyclohexanone | 8 | 7.9 | 0.1 |
| Ex.35 | (S-21) | Acid form | Cyclohexanone | 7.8 | 7.7 | 0.1 |
| Ex.36 | (S-22) | Acid form | Cyclohexanone | 8 | 8 | 0 |
| Ex.7 | (S-1) | Acetic acid | Toluene | 8 | 8 | 0 |
| Ex.8 | (S-19) | Acetic acid | Toluene | 7.2 | 7.2 | 0 |
| Ex.9 | (S-20) | Acetic acid | Toluene | 8 | 8 | 0 |
| Ex.10 | (S-2) | Acetic acid | Toluene | 7.2 | 7.2 | 0 |
| Ex.11 | (S-21) | Acetic acid | Toluene | 8 | 8 | 0 |
| Ex.12 | (S-22) | Acetic acid | Toluene | 7.2 | 7.2 | 0 |
| Ex.13 | (S-1) | Acetic acid | Cyclohexanone | 8.3 | 8 | 0.3 |
| Ex.14 | (S-19) | Acetic acid | Cyclohexanone | 7.6 | 7.2 | 0.4 |
| Ex.15 | (S-20) | Acetic acid | Cyclohexanone | 8.3 | 8 | 0.3 |
| Ex.16 | (S-2) | Acetic acid | Cyclohexanone | 7.6 | 7.2 | 0.4 |
| Ex.17 | (S-21) | Acetic acid | Cyclohexanone | 8.3 | 8 | 0.3 |
| Ex.18 | (S-22) | Acetic acid | Cyclohexanone | 7.6 | 7.2 | 0.4 |
| Ex.19 | (S-1) | Octanoic acid | Toluene | 8.3 | 8 | 0.3 |
| Ex.20 | (S-19) | Octanoic acid | Toluene | 7.6 | 7.2 | 0.4 |
| Ex.21 | (S-20) | Octanoic acid | Toluene | 8.3 | 8 | 0.3 |
| Ex.22 | (S-2) | Octanoic acid | Toluene | 7.6 | 7.2 | 0.4 |
| Ex.23 | (S-21) | Octanoic acid | Toluene | 8.3 | 8 | 0.3 |
| Ex.24 | (S-22) | Octanoic acid | Toluene | 7.6 | 7.2 | 0.4 |
| Comp. Ex.1 | (S-1) | None | Toluene | 11.2 | 9.2 | 2 |
| Comp. Ex.2 | (S-19) | None | Toluene | 10.9 | 9.6 | 1.3 |
| Comp. Ex.3 | (S-20) | None | Toluene | 11 | 9.3 | 1.7 |
| Comp. Ex.4 | (S-2) | None | Toluene | 10.9 | 9.2 | 1.7 |
| Comp. Ex.5 | (S-21) | None | Toluene | 10.9 | 9.2 | 1.7 |
| Comp. Ex.6 | (S-22) | None | Toluene | 10.9 | 9.2 | 1.7 |

Based on the results in Table 1, the solutions obtained in Examples were all determined to have good storage stability with little change in pH over time.

2. Polyurethane Resin Examples

Example 37

To 150 parts of cyclohexanone were added 2.2 parts of the mixture prepared in Example 3, 34.4 parts of polyether (Adeka polyether BPX-1000 made by Adeka Corp.), 27.2 parts of tricyclo[5,2,1,0(2,6)]decanedimethanol (made by Tokyo Chemical Industry Co., Ltd.), and 0.1 part of dibutyltin dilaurate, and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 36.3 parts of diphenylmethane diisocyanate (Millionate MT, made by Nippon Polyurethane Industry Co., Ltd.) were added. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were obtained by standard polystyrene conversion using DMF solvent containing 0.3 weight percent of lithium bromide. The weight average molecular weight was 70,000 and the Mw/Mn was 1.90. The sulfonic acid (salt) group content of the polyurethane obtained as measured by the following method was $6\times10^{-4}$ eq/g.

A sulfur preparation in the form of 1.0 weight part of copper sulfate pentahydrate (made by Wako Pure Chemical Industries, Ltd.) was dissolved in 49.0 weight parts of pure water. A 200 microliter quantity of the solution obtained was added dropwise to a filter paper with circle 30 mm in diameter, made by Shimadzu Corp., and dried for three hours at ordinary temperature under a vacuum. The luminous intensity of the sulfur was measured with a fluorescence X-ray analyzer, the LAB CENTER XRF-1700, made by Shimadzu Corp. Solutions in which the copper sulfate pentahydrate and water employed were changed to 0.1 weight part:49.9 weight parts and 0.5 weight part:49.5 weight parts were prepared, the luminous intensity of the sulfur was measured, and a calibration curve was plotted.

A 1.0 weight part quantity of polyurethane was dissolved in 49.0 weight parts of cyclohexanone. By the same method, the polyurethane solution was added dropwise to a filter paper with circle made by Shimadzu Corp., dried, and measured to determine the luminous intensity of the sulfur. The sulfur luminous intensity of the polyurethane solution was compared to that of the copper sulfate pentahydrate calibration curve, and the quantity of sulfonic acid (salt) groups contained in the polyurethane was determined.
Evaluation of Dispersibility A 4.1 part quantity of the nonmagnetic powder indicated below and one part of the polyurethane synthesized in Example 37 were suspended in a solution comprised of 10.8 parts of cyclohexanone and 16.2 parts of 2-butanone. To the suspension were added 90 parts of zirconia beads (made by Nikkato Corp.) and the mixture was dispersed for six hours. The solution obtained was coated on a polyethylene naphthalate (PEN) film made by Teijin (Ltd.) and dried to prepare a sheet. Measurement of the glossiness of the sheet resulted in a value of 191. The higher the glossiness, the better the powder dispersion indicated. The glossiness was measured with a GK-45D made by Suga Test Instruments Co., Ltd.

Nonmagnetic powder: α-iron oxide (surface treatment layers: $Al_2O_3$, $SiO_2$)

Average major axis length: 0.15 μm

Average acicular ratio: 7

Specific surface area by the BET method: 52 m$^2$/g pH 8

Example 38

To 54.1 parts of cyclohexanone were added 3.0 parts of the mixture prepared in Example 5, 33.3 parts of polyether (Adeka polyether BPX-1000 made by Adeka Corp.), 27.5 parts of tricyclo[5,2,1,0(2,6)]decanedimethanol (made by Tokyo Chemical Industry Co., Ltd.), and 0.1 part of dibutyltin dilaurate, and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 36.3 parts of diphenylmethane diisocyanate (Millionate MT, made by Nippon Polyurethane Industry Co., Ltd.) were added. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90. The sulfonic acid (salt) group content of the polyurethane obtained as measured by the above-described method was $6\times10^{-4}$ eq/g.

A sheet was prepared and the glossiness was measured by the same methods as in Example 37 using the polyurethane obtained, revealing a glossiness of 189.

Example 39

To 150 parts of cyclohexanone were added 2.2 parts of the mixture prepared in Example 3, 38.3 parts of polyether (Adeka polyether BPX-1000 made by Adeka Corp.), 18.4 parts of tricyclo[5,2,1,0(2,6)]decanedimethanol (made by Tokyo Chemical Industry Co., Ltd.), 4.8 parts glycerol monomethacrylate (Blemmer GLM, made by NOF Corporation), and 0.1 part of dibutyltin dilaurate, and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 36.3 parts of diphenylmethane diisocyanate (Millionate MT, made by Nippon Polyurethane Industry Co., Ltd.) were added. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90. The sulfonic acid (salt) group content of the polyurethane obtained as measured by the above-described method was $6\times10^{-4}$ eq/g.

A sheet was prepared and the glossiness was measured by the same methods as in Example 37 using the polyurethane obtained, revealing a glossiness of 191.

Example 40

To 54.1 parts of cyclohexanone were added 3.0 parts of the mixture prepared in Example 5, 37.3 parts of polyether (Adeka polyether BPX-1000 made by Adeka Corp.), 18.7 parts of tricyclo[5,2,1,0(2,6)]decanedimethanol (made by Tokyo Chemical Industry Co., Ltd.), 4.8 parts glycerol monomethacrylate (Blemmer GLM, made by NOF Corporation), and 0.1 part of dibutyltin dilaurate, and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 36.3 parts of diphenylmethane diisocyanate (Millionate MT, made by Nippon Polyurethane Industry Co., Ltd.) were added. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90. The sulfonic acid (salt) group content of the polyurethane obtained as measured by the above-described method was $6 \times 10^{-4}$ eq/g.

A sheet was prepared and the glossiness was measured by the same methods as in Example 37 using the polyurethane obtained, revealing a glossiness of 189.

Example 41

To 54.1 parts of cyclohexanone were added 3.0 parts of the mixture prepared in Example 6, 37.3 parts of polyether (Adeka polyether BPX-1000 made by Adeka Corp.), 18.7 parts of tricyclo[5,2,1,0(2,6)]decanedimethanol (made by molecular weight=4,500) comprising polyester of the structure indicated below, 35.7 parts of polyether (Adeka polyether BPX-1000 made by Adeka Corp.), 22.4 parts of tricyclo [5,2,1,0(2,6)]decanedimethanol (made by Tokyo Chemical Industry Co., Ltd.), and 0.1 part of dibutyltin dilaurate, and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 71.9 parts of N-methylpyrrolidone solution containing 50 weight percent of diphenylmethane diisocyanate (Millionate MT, made by Nippon Polyurethane Industry Co., Ltd.) were added at a rate yielding an internal temperature of 80 to 90° C. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90.

A sheet was prepared and the glossiness was measured by the same methods as in Example 37 using the polyurethane obtained, revealing a glossiness of 145.

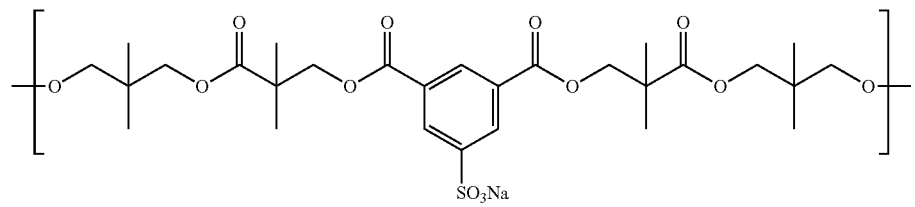

Tokyo Chemical Industry Co., Ltd.), 4.8 parts glycerol monomethacrylate (Blemmer GLM, made by NOF Corporation), and 0.1 part of dibutyltin dilaurate, and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 36.3 parts of diphenylmethane diisocyanate (Millionate MT, made by Nippon Polyurethane Industry Co., Ltd.) were added. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90. The sulfonic acid (salt) group content of the polyurethane obtained as measured by the above-described method was $6 \times 10^{-4}$ eq/g.

A sheet was prepared and the glossiness was measured by the same methods as in Example 37 using the polyurethane obtained, revealing a glossiness of 193.

Comparative Example 7

To 54.1 parts of N-methylpyrrolidone were added 5.7 parts of the sulfonate group-containing compound (weight average Example 42

To 54.1 parts of N-methylpyrrolidone were added 1.7 parts of the mixture prepared in Example 1, 40.7 parts of polyether (Adeka polyether BPX-1000 made by Adeka Corp.), and 21.4 parts of tricyclo[5,2,1,0(2,6)]decanedimethanol (made by Tokyo Chemical Industry Co., Ltd.) and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 71.9 parts of N-methylpyrrolidone solution containing 50 weight percent of diphenylmethane diisocyanate (Millionate MT, made by Nippon Polyurethane Industry Co., Ltd.) were added at a rate yielding an internal temperature of 80 to 90° C. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90. The sulfonic acid (salt) group content of the polyurethane obtained as measured by the above-described method was $6 \times 10^{-4}$ eq/g.

A 7.3 part quantity of the barium ferrite powder indicated below and 1 part of the polyurethane synthesized above were suspended in a solution comprised of 11.9 parts of cyclohexanone and 17.7 parts of 2-butanone. To the suspension were added 90 parts of zirconia beads (made by Nikkato Corp.) and the mixture was dispersed for 6 hours. Measurement of the ratio of the abundance of the dispersion solution polyurethane on the surface of the barium ferrite powder/in the solution by the method set forth below revealed it to be 4.0/1. The sulfur content in the solution as measured with fluorescence X-rays was below the threshold of detection. Since no sulfur derived from sulfonic acid (salt) groups could be detected in the solution, the polyurethane synthesized as set forth above was determined to be nearly absent from the solution and to have adsorbed nearly completely to the powder. Subsequently, the liquid obtained was coated and dried to prepare a sheet. The glossiness of the sheet was measured by the same method as that set forth above, revealing a glossiness of 171.

Ferromagnetic hexagonal barium ferrite powder
Composition excluding oxygen (mole ratio): Ba/Fe/Co/Zn=1/9/0.2/1
Hc: 176 kA/m (2,200 Oe)
Average particle diameter: 25 nm
Average plate ratio: 3
BET specific surface area: 65 m²/g
σs: 49 A·m²/kg (49 emu/g)
pH: 7

—Method of Measuring Abundance Ratio of Polyurethane—

The barium ferrite powder was centrifugally separated from the dispersion solution using a small separation-use ultracentrifuge CS 150GXL made by Hitachi under conditions of 100,000 rpm for 80 minutes. A 3 mL quantity of the supernatant was measured out and weighed. It was then dried under conditions of 40° C. for 18 hours, and then further dried under vacuum at 140° C. for 3 hours. The weight of the dried product was adopted as the non-adsorbed solid component of the polyurethane. The abundance ratio of the polyurethane on the surface of the barium ferrite powder/in the solution was calculated from the polyurethane observed in the supernatant and the polyurethane used in the dispersion.

Comparative Example 8

To 54.1 parts of N-methylpyrrolidone were added 31.2 parts of the sulfonic acid compound (weight average molecular weight=4,500) comprising the polyester used to synthesize the polyurethane of Comparative Example 7, 35.7 parts of polyether (Adeka polyether BPX-1000 made by Adeka Corp.), 21.9 parts of tricyclo[5,2,1,0(2,6)]decanedimethanol (made by Tokyo Chemical Industry Co., Ltd.), and 0.1 part of dibutyltin dilaurate and the mixture was stirred for 30 minutes at room temperature and fully dissolved. The moisture within the flask was measured with a Karl Fischer moisture analyzer and an equimolar quantity of diphenylmethane diisocyanate (Millionate MT, made by Nippon Polyurethane Industry Co., Ltd.) was added for the water content. The internal temperature was set to 80° C. and 71.9 parts of N-methylpyrrolidone solution containing 50 weight percent of diphenylmethane diisocyanate (Millionate MT, made by Nippon Polyurethane Industry Co., Ltd.) were added at a rate yielding an internal temperature of 80 to 90° C. The mixture was stirred for 4 hours at an internal temperature of 80 to 90° C. and then cooled to room temperature.

The weight average molecular weight and the weight average molecular weight/number average molecular weight (Mw/Mn) of the polyurethane obtained were measured by the same method as in Example 37, revealing a weight average molecular weight of 70,000 and an Mw/Mn of 1.90.

A dispersion was prepared and the abundance ratio on the surface of barium ferrite powder/in the solution was measured by the same methods as in Example 42 using the polyurethane obtained, yielding a ratio of 2.6/1.

A sheet was prepared and the glossiness was measured by the same methods as in Example 42 using the polyurethane obtained, revealing a glossiness of 145.

The mixture of the present invention is useful as a starting material in various organic compound reactions, such as in the synthesis of polyurethane resins.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A polyurethane resin, obtained from starting materials in the form of an isocyanate compound and a mixture or a solution composition comprised of an organic solvent in which the mixture is dissolved, wherein the mixture is a mixture of a sulfonate group-containing compound denoted by formula (1) with a protonic acid which is a sulfonic acid group-containing compound denoted by formula (2):

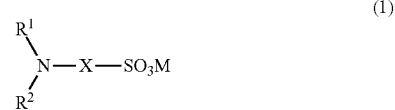

wherein, in formula (1), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a cation other than hydrogen;

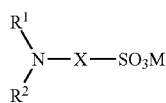
(2)

wherein, in formula (2), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a hydrogen.

2. The polyurethane resin according to claim 1, which comprises a sulfonic acid (salt) group in a quantity of $1\times10^{-5}$ eq/g to $2\times10^{-3}$ eq/g.

3. The polyurethane resin according to claim 1, wherein the starting materials further comprises a diol comprising a (meth)acryloyloxy group.

4. A method of manufacturing a polyurethane resin, comprising:
subjecting a mixture or a solution composition comprised of an organic solvent in which the mixture is dissolved to an urethane-forming reaction with an isocyanate compound, wherein
the mixture is a mixture of a sulfonate group-containing compound denoted by formula (1) with a protonic acid which is a sulfonic acid group-containing compound denoted by formula (2):

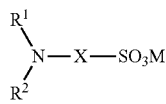
(1)

wherein, in formula (1), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a cation other than hydrogen;

(2)

wherein, in formula (2), X denotes a divalent linking group; each of $R^1$ and $R^2$ independently denotes an alkyl group comprising at least one hydroxyl group and equal to or more than three carbon atoms or an aralkyl group comprising at least one hydroxyl group and equal to or more than eight carbon atoms; and M denotes a hydrogen.

5. The method of manufacturing according to claim 4 wherein the urethane-forming reaction is conducted in the presence of a catalyst.

6. The method of manufacturing according to claim 5 wherein the mixture or the solution composition is subjected to the urethane-forming reaction after adding the catalyst thereto.

\* \* \* \* \*